US012786148B2

(12) United States Patent
Baldwin et al.

(10) Patent No.: US 12,786,148 B2
(45) Date of Patent: Nov. 3, 2026

(54) GENERATING CUSTOMIZED ELECTRONIC MESSAGING GRAPHICS

(71) Applicant: Snap Inc., Santa Monica, CA (US)

(72) Inventors: Dorian Franklin Baldwin, Toronto (CA); Jacob Edward Blackstock, Toronto (CA); Shahan Panth, Toronto (CA); David James Kennedy, Toronto (CA)

(73) Assignee: Snap Inc., Santa Monica, CA (US)

( * ) Notice: Subject to any disclaimer, the term of this patent is extended or adjusted under 35 U.S.C. 154(b) by 396 days.

(21) Appl. No.: 18/056,079

(22) Filed: Nov. 16, 2022

(65) Prior Publication Data

US 2023/0070671 A1 Mar. 9, 2023

Related U.S. Application Data

(63) Continuation of application No. 16/421,063, filed on May 23, 2019, now Pat. No. 11,509,615, which is a (Continued)

(51) Int. Cl.
*G06T 11/60* (2026.01)
*G06F 3/0481* (2022.01)

(Continued)

(52) U.S. Cl.
CPC ............ *H04L 51/10* (2013.01); *G06F 3/0481* (2013.01); *G06F 40/20* (2020.01); *G06T 11/00* (2013.01);

(Continued)

(58) Field of Classification Search
CPC ....... H04L 51/10; H04L 51/04; H04L 51/222; H04L 51/52; H04L 67/02; G06F 3/0481;

(Continued)

(56) References Cited

U.S. PATENT DOCUMENTS 666,223 A * 1/1901 Shedlock ................ F25B 17/00 62/481
4,581,634 A 4/1986 Williams (Continued)

FOREIGN PATENT DOCUMENTS

CA 2887596 A1 7/2015
CN 1842005 A 10/2006

(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — Kathleen M Broughton
(74) *Attorney, Agent, or Firm* — SCHWEGMAN LUNDBERG & WOESSNER, P.A.

(57) ABSTRACT

A system according to various exemplary embodiments includes a processor and a user interface coupled to the processor, the user interface comprising an input device and a display screen. The system further comprises a sensor component coupled to the processor, the sensor component comprising a location sensor for determining location information associated with the system, and memory coupled to the processor and storing instructions that, when executed by the processor, cause the system to perform operations comprising: retrieving sensor information from the sensor component, the sensor information including location information from the location sensor; retrieving, from the memory, avatar information associated with a user of the system; generating a customized graphic based on the sensor information and the user's avatar information; and presenting the customized graphic within an electronic message via the display screen of the user interface.

20 Claims, 9 Drawing Sheets

Related U.S. Application Data continuation of application No. 15/290,943, filed on Oct. 11, 2016, now Pat. No. 10,348,662.

(60) Provisional application No. 62/364,190, filed on Jul. 19, 2016.

(51) Int. Cl.

| | |
|---|---|
| ***G06F 40/20*** | (2020.01) |
| ***G06T 11/00*** | (2006.01) |
| ***G06V 40/16*** | (2022.01) |
| ***H04L 51/04*** | (2022.01) |
| ***H04L 51/10*** | (2022.01) |
| ***H04L 51/222*** | (2022.01) |
| ***H04L 51/52*** | (2022.01) |
| ***H04L 67/02*** | (2022.01) |
| ***H04W 4/02*** | (2018.01) |
| ***H04W 4/12*** | (2009.01) |
| *G06T 3/40* | (2006.01) |

(52) U.S. Cl.

CPC ............ *G06T 11/60* (2013.01); *G06V 40/174* (2022.01); *H04L 51/04* (2013.01); *H04L 51/222* (2022.05); *H04L 51/52* (2022.05); *H04L 67/02* (2013.01); *H04W 4/02* (2013.01); *H04W 4/12* (2013.01); *G06T 3/40* (2013.01)

(58) Field of Classification Search

CPC .......... G06F 40/20; G06T 11/00; G06T 11/60; G06T 3/40; G06V 40/174; H04W 4/02; H04W 4/12; G06Q 50/50

See application file for complete search history.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,880,731 | A | 3/1999 | Liles et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,023,270 | A | 2/2000 | Brush, II et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,223,165 | B1 | 4/2001 | Lauffer |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,772,195 | B1 | 8/2004 | Hatlelid et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,842,779 | B1 | 1/2005 | Nishizawa |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,342,587 | B2 | 3/2008 | Danzig et al. |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,468,729 | B1 | 12/2008 | Levinson |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,636,755 | B2 | 12/2009 | Blattner et al. |
| 7,639,251 | B2 | 12/2009 | Gu et al. |
| 7,639,943 | B1 | 12/2009 | Kalajan |
| 7,650,231 | B2 | 1/2010 | Gadler |
| 7,668,537 | B2 | 2/2010 | DeVries |
| 7,770,137 | B2 | 8/2010 | Forbes et al. |
| 7,775,885 | B2 | 8/2010 | Van et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 7,859,551 | B2 | 12/2010 | Bulman et al. |
| 7,885,931 | B2 | 2/2011 | Seo et al. |
| 7,908,554 | B1 | 3/2011 | Blattner |
| 7,925,703 | B2 | 4/2011 | Dinan et al. |
| 8,001,204 | B2 | 8/2011 | Burtner et al. |
| 8,032,586 | B2 | 10/2011 | Challenger et al. |
| 8,082,255 | B1 | 12/2011 | Carlson, Jr. et al. |
| 8,088,044 | B2 | 1/2012 | Tchao et al. |
| 8,090,351 | B2 | 1/2012 | Klein |

(56) References Cited

U.S. PATENT DOCUMENTS 8,095,878 B2 1/2012 Bates et al.
8,098,904 B2 1/2012 Ioffe et al.
8,099,109 B2 1/2012 Altman et al.
8,108,774 B2 1/2012 Finn et al.
8,112,716 B2 2/2012 Kobayashi
8,117,281 B2 2/2012 Robinson et al.
8,130,219 B2 3/2012 Fleury et al.
8,131,597 B2 3/2012 Hudetz
8,135,166 B2 3/2012 Rhoads
8,136,028 B1 3/2012 Loeb et al.
8,146,001 B1 3/2012 Reese
8,146,005 B2 3/2012 Jones et al.
8,151,191 B2 4/2012 Nicol
8,161,115 B2 4/2012 Yamamoto
8,161,417 B1 4/2012 Lee
8,195,203 B1 6/2012 Tseng
8,199,747 B2 6/2012 Rojas et al.
8,208,943 B2 6/2012 Petersen
8,214,443 B2 7/2012 Hamburg
8,234,350 B1 7/2012 Gu et al.
8,276,092 B1 9/2012 Narayanan et al.
8,279,319 B2 10/2012 Date
8,280,406 B2 10/2012 Ziskind et al.
8,285,199 B2 10/2012 Hsu et al.
8,287,380 B2 10/2012 Nguyen et al.
8,301,159 B2 10/2012 Hamynen et al.
8,306,922 B1 11/2012 Kunal et al.
8,312,086 B2 11/2012 Velusamy et al.
8,312,097 B1 11/2012 Siegel et al.
8,326,315 B2 12/2012 Phillips et al.
8,326,327 B2 12/2012 Hymel et al.
8,332,475 B2 12/2012 Rosen et al.
8,352,546 B1 1/2013 Dollard
8,379,130 B2 2/2013 Forutanpour et al.
8,384,719 B2 2/2013 Reville et al.
8,385,950 B1 2/2013 Wagner et al.
RE44,054 E 3/2013 Kim
8,396,708 B2 3/2013 Park et al.
8,402,097 B2 3/2013 Szeto
8,405,773 B2 3/2013 Hayashi et al.
8,418,067 B2 4/2013 Cheng et al.
8,423,409 B2 4/2013 Rao
8,425,322 B2 4/2013 Gillo et al.
8,458,601 B2 6/2013 Castelli et al.
8,462,198 B2 6/2013 Lin et al.
8,471,914 B2 6/2013 Sakiyama et al.
8,472,935 B1 6/2013 Fujisaki
8,484,158 B2 7/2013 Deluca et al.
8,495,503 B2 7/2013 Brown et al.
8,495,505 B2 7/2013 Smith et al.
8,504,926 B2 8/2013 Wolf
8,510,383 B2 8/2013 Hurley et al.
8,527,345 B2 9/2013 Rothschild et al.
8,554,627 B2 10/2013 Svendsen et al.
8,559,980 B2 10/2013 Pujol
8,560,612 B2 10/2013 Kilmer et al.
8,564,621 B2 10/2013 Branson et al.
8,564,710 B2 10/2013 Nonaka et al.
8,581,911 B2 11/2013 Becker et al.
8,594,680 B2 11/2013 Ledlie et al.
8,597,121 B2 12/2013 Del
8,601,051 B2 12/2013 Wang
8,601,379 B2 12/2013 Marks et al.
8,613,089 B1 12/2013 Holloway et al.
8,632,408 B2 1/2014 Gillo et al.
8,648,865 B2 2/2014 Dawson et al.
8,659,548 B2 2/2014 Hildreth
8,660,358 B1 2/2014 Bergboer et al.
8,660,369 B2 2/2014 Llano et al.
8,660,793 B2 2/2014 Ngo et al.
8,682,350 B2 3/2014 Altman et al.
8,683,354 B2 3/2014 Khandelwal et al.
8,692,830 B2 4/2014 Nelson et al.
8,718,333 B2 5/2014 Wolf et al.
8,724,622 B2 5/2014 Rojas
8,732,168 B2 5/2014 Johnson
8,744,523 B2 6/2014 Fan et al.
8,745,132 B2 6/2014 Obradovich
8,761,800 B2 6/2014 Kuwahara
8,768,876 B2 7/2014 Shim et al.
8,775,972 B2 7/2014 Spiegel
8,788,680 B1 7/2014 Naik
8,790,187 B2 7/2014 Walker et al.
8,797,415 B2 8/2014 Arnold
8,798,646 B1 8/2014 Wang et al.
8,810,513 B2 8/2014 Ptucha et al.
8,812,171 B2 8/2014 Filev et al.
8,832,201 B2 9/2014 Wall
8,832,552 B2 9/2014 Arrasvuori et al.
8,839,327 B2 9/2014 Amento et al.
8,856,349 B2 10/2014 Jain et al.
8,874,677 B2 10/2014 Rosen et al.
8,886,227 B2 11/2014 Schmidt et al.
8,890,926 B2 11/2014 Tandon et al.
8,892,999 B2 11/2014 Nims et al.
8,909,679 B2 12/2014 Root et al.
8,909,725 B1 12/2014 Sehn
8,924,250 B2 12/2014 Bates et al.
8,963,926 B2 2/2015 Brown et al.
8,972,357 B2 3/2015 Shim et al.
8,989,786 B2 3/2015 Feghali
8,995,433 B2 3/2015 Rojas
9,015,285 B1 4/2015 Ebsen et al.
9,020,745 B2 4/2015 Johnston et al.
9,040,574 B2 5/2015 Wang et al.
9,055,416 B2 6/2015 Rosen et al.
9,086,776 B2 7/2015 Ye et al.
9,094,137 B1 7/2015 Sehn et al.
9,100,806 B2 8/2015 Rosen et al.
9,100,807 B2 8/2015 Rosen et al.
9,105,014 B2 8/2015 Collet et al.
9,113,301 B1 8/2015 Spiegel et al.
9,119,027 B2 8/2015 Sharon et al.
9,123,074 B2 9/2015 Jacobs et al.
9,143,382 B2 9/2015 Bhogal et al.
9,143,681 B1 9/2015 Ebsen et al.
9,152,477 B1 10/2015 Campbell et al.
9,191,776 B2 11/2015 Root et al.
9,204,252 B2 12/2015 Root
9,225,897 B1 12/2015 Sehn et al.
9,241,184 B2 1/2016 Weerasinghe
9,256,860 B2 2/2016 Herger et al.
9,258,459 B2 2/2016 Hartley
9,298,257 B2 3/2016 Hwang et al.
9,314,692 B2 4/2016 Konoplev et al.
9,330,483 B2 5/2016 Du et al.
9,344,606 B2 5/2016 Hartley et al.
9,357,174 B2 5/2016 Li et al.
9,361,510 B2 6/2016 Yao et al.
9,378,576 B2 6/2016 Bouaziz et al.
9,385,983 B1 7/2016 Sehn
9,396,354 B1 7/2016 Murphy et al.
9,402,057 B2 7/2016 Kaytaz et al.
9,407,712 B1 8/2016 Sehn
9,407,816 B1 8/2016 Sehn
9,412,192 B2 8/2016 Mandel et al.
9,430,783 B1 8/2016 Sehn
9,439,041 B2 9/2016 Parvizi et al.
9,443,227 B2 9/2016 Evans et al.
9,450,907 B2 9/2016 Pridmore et al.
9,459,778 B2 10/2016 Hogeg et al.
9,460,541 B2 10/2016 Li et al.
9,489,661 B2 11/2016 Evans et al.
9,489,760 B2 11/2016 Li et al.
9,491,134 B2 11/2016 Rosen et al.
9,503,845 B2 11/2016 Vincent
9,508,197 B2 11/2016 Quinn et al.
9,532,171 B2 12/2016 Allen et al.
9,537,811 B2 1/2017 Allen et al.
9,544,257 B2 1/2017 Ogundokun et al.
9,576,400 B2 2/2017 Van Os et al.
9,589,357 B2 3/2017 Li et al.
9,592,449 B2 3/2017 Barbalet et al.
9,628,950 B1 4/2017 Noeth et al.

(56) References Cited

U.S. PATENT DOCUMENTS 9,648,376 B2 5/2017 Chang et al.
9,697,635 B2 7/2017 Quinn et al.
9,706,040 B2 7/2017 Kadirvel et al.
9,710,821 B2 7/2017 Heath
9,744,466 B2 8/2017 Fujioka
9,746,990 B2 8/2017 Anderson et al.
9,749,270 B2 8/2017 Collet et al.
9,792,714 B2 10/2017 Li et al.
9,839,844 B2 12/2017 Dunstan et al.
9,854,219 B2 12/2017 Sehn
9,858,316 B1 1/2018 Cronin et al.
9,883,838 B2 2/2018 Kaleal, III et al.
9,898,849 B2 2/2018 Du et al.
9,911,073 B1 3/2018 Spiegel et al.
9,936,165 B2 4/2018 Li et al.
9,959,037 B2 5/2018 Chaudhri et al.
9,980,100 B1 5/2018 Charlton et al.
9,990,373 B2 6/2018 Fortkort
10,039,988 B2 8/2018 Lobb et al.
10,097,492 B2 10/2018 Tsuda et al.
10,116,598 B2 10/2018 Tucker et al.
10,155,168 B2 12/2018 Blackstock et al.
10,242,477 B1 3/2019 Charlton et al.
10,242,503 B2 3/2019 McPhee et al.
10,262,250 B1 4/2019 Spiegel et al.
10,348,662 B2 * 7/2019 Baldwin ............... H04L 51/222
10,362,219 B2 7/2019 Wilson et al.
10,475,225 B2 11/2019 Park et al.
10,504,266 B2 12/2019 Blattner et al.
10,573,048 B2 2/2020 Ni et al.
10,657,701 B2 5/2020 Osman et al.
11,509,615 B2 * 11/2022 Baldwin ................. H04L 67/02
2002/0047868 A1 4/2002 Miyazawa
2002/0067362 A1 6/2002 Agostino Nocera et al.
2002/0078456 A1 6/2002 Hudson et al.
2002/0087631 A1 7/2002 Sharma
2002/0097257 A1 7/2002 Miller et al.
2002/0122659 A1 9/2002 Mcgrath et al.
2002/0128047 A1 9/2002 Gates
2002/0144154 A1 10/2002 Tomkow
2002/0169644 A1 11/2002 Greene
2003/0001846 A1 1/2003 Davis et al.
2003/0016247 A1 1/2003 Lai et al.
2003/0017823 A1 1/2003 Mager et al.
2003/0020623 A1 1/2003 Cao et al.
2003/0023874 A1 1/2003 Prokupets et al.
2003/0037124 A1 2/2003 Yamaura et al.
2003/0052925 A1 3/2003 Daimon et al.
2003/0101230 A1 5/2003 Benschoter et al.
2003/0110503 A1 6/2003 Perkes
2003/0126215 A1 7/2003 Udell
2003/0148773 A1 8/2003 Spriestersbach et al.
2003/0164856 A1 9/2003 Prager et al.
2003/0229607 A1 12/2003 Zellweger et al.
2004/0027371 A1 2/2004 Jaeger
2004/0064429 A1 4/2004 Hirstius et al.
2004/0078367 A1 4/2004 Anderson et al.
2004/0111467 A1 6/2004 Willis
2004/0158739 A1 8/2004 Wakai et al.
2004/0189465 A1 9/2004 Capobianco et al.
2004/0203959 A1 10/2004 Coombes
2004/0215625 A1 10/2004 Svendsen et al.
2004/0243531 A1 12/2004 Dean
2004/0243688 A1 12/2004 Wugofski
2005/0021444 A1 1/2005 Bauer et al.
2005/0022211 A1 1/2005 Veselov et al.
2005/0048989 A1 3/2005 Jung
2005/0078804 A1 4/2005 Yomoda
2005/0097176 A1 5/2005 Schatz et al.
2005/0102381 A1 5/2005 Jiang et al.
2005/0104976 A1 5/2005 Currans
2005/0114783 A1 5/2005 Szeto
2005/0119936 A1 6/2005 Buchanan et al.
2005/0122405 A1 6/2005 Voss et al.
2005/0162419 A1 7/2005 Kim et al.
2005/0193340 A1 9/2005 Amburgey et al.
2005/0193345 A1 9/2005 Klassen et al.
2005/0198128 A1 9/2005 Anderson
2005/0206610 A1 9/2005 Cordelli
2005/0223066 A1 10/2005 Buchheit et al.
2005/0288954 A1 12/2005 McCarthy et al.
2006/0026067 A1 2/2006 Nicholas et al.
2006/0107297 A1 5/2006 Toyama et al.
2006/0114338 A1 6/2006 Rothschild
2006/0119882 A1 6/2006 Harris et al.
2006/0242239 A1 10/2006 Morishima et al.
2006/0252438 A1 11/2006 Ansamaa et al.
2006/0265417 A1 11/2006 Amato et al.
2006/0270419 A1 11/2006 Crowley et al.
2006/0287878 A1 12/2006 Wadhwa et al.
2006/0294465 A1 * 12/2006 Ronen .................. H04M 1/576
715/706
2007/0004426 A1 1/2007 Pfleging et al.
2007/0038715 A1 2/2007 Collins et al.
2007/0040931 A1 2/2007 Nishizawa
2007/0073517 A1 3/2007 Panje
2007/0073823 A1 3/2007 Cohen et al.
2007/0075898 A1 4/2007 Markhovsky et al.
2007/0082707 A1 4/2007 Flynt et al.
2007/0113181 A1 5/2007 Blattner et al.
2007/0136228 A1 6/2007 Petersen
2007/0168863 A1 * 7/2007 Blattner .................. G06F 3/011
715/706
2007/0176921 A1 8/2007 Iwasaki et al.
2007/0192128 A1 8/2007 Celestini
2007/0198340 A1 8/2007 Lucovsky et al.
2007/0198495 A1 8/2007 Buron et al.
2007/0208751 A1 9/2007 Cowan et al.
2007/0210936 A1 9/2007 Nicholson
2007/0214180 A1 9/2007 Crawford
2007/0214216 A1 9/2007 Carrer et al.
2007/0233556 A1 10/2007 Koningstein
2007/0233801 A1 10/2007 Eren et al.
2007/0233859 A1 10/2007 Zhao et al.
2007/0243887 A1 10/2007 Bandhole et al.
2007/0244750 A1 10/2007 Grannan et al.
2007/0255456 A1 11/2007 Funayama
2007/0281690 A1 12/2007 Altman et al.
2008/0022329 A1 1/2008 Glad
2008/0025701 A1 1/2008 Ikeda
2008/0032703 A1 2/2008 Krumm et al.
2008/0033930 A1 2/2008 Warren
2008/0043041 A2 2/2008 Hedenstroem et al.
2008/0049704 A1 2/2008 Witteman et al.
2008/0062141 A1 3/2008 Chandhri
2008/0076505 A1 3/2008 Ngyen et al.
2008/0092233 A1 4/2008 Tian et al.
2008/0094387 A1 4/2008 Chen
2008/0104503 A1 5/2008 Beall et al.
2008/0109844 A1 5/2008 Baldeschweiler et al.
2008/0120409 A1 5/2008 Sun et al.
2008/0147730 A1 6/2008 Lee et al.
2008/0148150 A1 6/2008 Mall
2008/0158222 A1 7/2008 Li et al.
2008/0158230 A1 7/2008 Sharma et al.
2008/0168033 A1 7/2008 Ott et al.
2008/0168489 A1 7/2008 Schraga
2008/0189177 A1 8/2008 Anderton et al.
2008/0207176 A1 8/2008 Brackbill et al.
2008/0208692 A1 8/2008 Garaventi et al.
2008/0214210 A1 9/2008 Rasanen et al.
2008/0222545 A1 9/2008 Lemay
2008/0255976 A1 10/2008 Altberg et al.
2008/0256446 A1 10/2008 Yamamoto
2008/0256577 A1 10/2008 Funaki et al.
2008/0266421 A1 10/2008 Takahata et al.
2008/0270938 A1 10/2008 Carlson
2008/0288338 A1 11/2008 Wiseman et al.
2008/0306826 A1 12/2008 Kramer et al.
2008/0313329 A1 12/2008 Wang et al.
2008/0313346 A1 12/2008 Kujawa et al.
2008/0318616 A1 12/2008 Chipalkatti et al.
2009/0006191 A1 1/2009 Arankalle et al.
2009/0006565 A1 1/2009 Velusamy et al.

(56) References Cited

U.S. PATENT DOCUMENTS

2009/0015703 A1 1/2009 Kim et al.
2009/0016617 A1 1/2009 Bregman-Amitai et al.
2009/0024956 A1 1/2009 Kobayashi
2009/0030774 A1 1/2009 Rothschild et al.
2009/0030999 A1 1/2009 Gatzke et al.
2009/0040324 A1 2/2009 Nonaka
2009/0042588 A1 2/2009 Lottin et al.
2009/0044113 A1* 2/2009 Jones ...................... G06T 13/40 715/707
2009/0055484 A1 2/2009 Vuong et al.
2009/0058822 A1 3/2009 Chaudhri
2009/0070688 A1 3/2009 Gyorfi et al.
2009/0079846 A1 3/2009 Chou
2009/0089678 A1 4/2009 Sacco et al.
2009/0089710 A1 4/2009 Wood et al.
2009/0093261 A1 4/2009 Ziskind
2009/0099925 A1 4/2009 Mehta et al.
2009/0106672 A1 4/2009 Burstrom
2009/0132341 A1 5/2009 Klinger
2009/0132453 A1 5/2009 Hangartner et al.
2009/0132665 A1 5/2009 Thomsen et al.
2009/0148045 A1 6/2009 Lee et al.
2009/0153492 A1 6/2009 Popp
2009/0157450 A1 6/2009 Athsani et al.
2009/0157752 A1 6/2009 Gonzalez
2009/0158170 A1 6/2009 Narayanan et al.
2009/0160970 A1 6/2009 Fredlund et al.
2009/0163182 A1 6/2009 Gatti et al.
2009/0177299 A1 7/2009 Van De Sluis
2009/0177976 A1 7/2009 Bokor et al.
2009/0192900 A1 7/2009 Collision
2009/0199242 A1 8/2009 Johnson et al.
2009/0202114 A1 8/2009 Morin et al.
2009/0215469 A1 8/2009 Fisher et al.
2009/0232354 A1 9/2009 Camp, Jr. et al.
2009/0234815 A1 9/2009 Boerries et al.
2009/0239552 A1 9/2009 Churchill et al.
2009/0249222 A1 10/2009 Schmidt et al.
2009/0249244 A1 10/2009 Robinson et al.
2009/0265604 A1 10/2009 Howard et al.
2009/0265647 A1 10/2009 Martin et al.
2009/0288022 A1 11/2009 Almstrand et al.
2009/0291672 A1 11/2009 Treves et al.
2009/0292608 A1 11/2009 Polachek
2009/0300525 A1* 12/2009 Jolliff ................ H04M 1/72427 715/764
2009/0303984 A1 12/2009 Clark et al.
2009/0319607 A1 12/2009 Belz et al.
2009/0327073 A1 12/2009 Li
2010/0011422 A1 1/2010 Mason et al.
2010/0023885 A1 1/2010 Reville et al.
2010/0062794 A1 3/2010 Han
2010/0082427 A1 4/2010 Burgener et al.
2010/0082693 A1 4/2010 Hugg et al.
2010/0100568 A1 4/2010 Papin et al.
2010/0113065 A1 5/2010 Narayan et al.
2010/0115426 A1 5/2010 Liu et al.
2010/0130233 A1 5/2010 Parker
2010/0131880 A1 5/2010 Lee et al.
2010/0131895 A1 5/2010 Wohlert
2010/0153144 A1 6/2010 Miller et al.
2010/0159944 A1 6/2010 Pascal et al.
2010/0161658 A1 6/2010 Hamynen et al.
2010/0161831 A1 6/2010 Haas et al.
2010/0162149 A1 6/2010 Sheleheda et al.
2010/0183280 A1 7/2010 Beauregard et al.
2010/0185552 A1 7/2010 Deluca et al.
2010/0185665 A1 7/2010 Horn et al.
2010/0191631 A1 7/2010 Weidmann
2010/0197318 A1 8/2010 Petersen et al.
2010/0197319 A1 8/2010 Petersen et al.
2010/0198683 A1 8/2010 Aarabi
2010/0198694 A1 8/2010 Muthukrishnan
2010/0198826 A1 8/2010 Petersen et al.
2010/0198828 A1 8/2010 Petersen et al.
2010/0198862 A1 8/2010 Jennings et al.
2010/0198870 A1 8/2010 Petersen et al.
2010/0198917 A1 8/2010 Petersen et al.
2010/0201482 A1 8/2010 Robertson et al.
2010/0201536 A1 8/2010 Robertson et al.
2010/0203968 A1 8/2010 Gill et al.
2010/0214436 A1 8/2010 Kim et al.
2010/0223128 A1 9/2010 Dukellis et al.
2010/0223343 A1 9/2010 Bosan et al.
2010/0227682 A1 9/2010 Reville et al.
2010/0250109 A1 9/2010 Johnston et al.
2010/0257196 A1 10/2010 Waters et al.
2010/0259386 A1 10/2010 Holley et al.
2010/0273509 A1 10/2010 Sweeney et al.
2010/0281045 A1 11/2010 Dean
2010/0306669 A1 12/2010 Della Pasqua
2011/0004071 A1 1/2011 Faiola et al.
2011/0010205 A1 1/2011 Richards
2011/0029512 A1 2/2011 Folgner et al.
2011/0040783 A1 2/2011 Uemichi et al.
2011/0040804 A1 2/2011 Peirce et al.
2011/0050909 A1 3/2011 Ellenby et al.
2011/0050915 A1 3/2011 Wang et al.
2011/0064388 A1 3/2011 Brown et al.
2011/0066743 A1 3/2011 Hurley et al.
2011/0083101 A1 4/2011 Sharon et al.
2011/0093780 A1 4/2011 Dunn
2011/0102630 A1 5/2011 Rukes
2011/0115798 A1 5/2011 Nayar et al.
2011/0119133 A1 5/2011 Gelman et al.
2011/0137881 A1 6/2011 Cheng et al.
2011/0145564 A1 6/2011 Moshir et al.
2011/0148864 A1 6/2011 Lee et al.
2011/0159890 A1 6/2011 Fortescue et al.
2011/0164163 A1 7/2011 Bilbrey et al.
2011/0197194 A1 8/2011 D'Angelo et al.
2011/0202598 A1 8/2011 Evans et al.
2011/0202968 A1 8/2011 Nurmi
2011/0211534 A1 9/2011 Schmidt et al.
2011/0213845 A1 9/2011 Logan et al.
2011/0215966 A1 9/2011 Kim et al.
2011/0225048 A1 9/2011 Nair
2011/0238763 A1 9/2011 Shin et al.
2011/0239136 A1 9/2011 Goldman et al.
2011/0255736 A1 10/2011 Thompson et al.
2011/0273575 A1 11/2011 Lee
2011/0282799 A1 11/2011 Huston
2011/0283188 A1 11/2011 Farrenkopf
2011/0296324 A1 12/2011 Goossens et al.
2011/0314419 A1 12/2011 Dunn et al.
2011/0320373 A1 12/2011 Lee et al.
2012/0028659 A1 2/2012 Whitney et al.
2012/0033718 A1 2/2012 Kauffman et al.
2012/0036015 A1 2/2012 Sheikh
2012/0036443 A1 2/2012 Ohmori et al.
2012/0054797 A1 3/2012 Skog et al.
2012/0059722 A1 3/2012 Rao
2012/0062805 A1 3/2012 Candelore
2012/0084731 A1 4/2012 Filman et al.
2012/0084835 A1 4/2012 Thomas et al.
2012/0099800 A1 4/2012 Llano et al.
2012/0108293 A1 5/2012 Law et al.
2012/0110096 A1 5/2012 Smarr et al.
2012/0113106 A1 5/2012 Choi et al.
2012/0113143 A1 5/2012 Adhikari et al.
2012/0113272 A1 5/2012 Hata
2012/0123830 A1 5/2012 Svendsen et al.
2012/0123871 A1 5/2012 Svendsen et al.
2012/0123875 A1 5/2012 Svendsen et al.
2012/0124126 A1 5/2012 Alcazar et al.
2012/0124176 A1 5/2012 Curtis et al.
2012/0124458 A1 5/2012 Cruzada
2012/0130717 A1 5/2012 Xu et al.
2012/0131507 A1 5/2012 Sparandara et al.
2012/0131512 A1 5/2012 Takeuchi et al.
2012/0143760 A1 6/2012 Abulafia et al.
2012/0150978 A1 6/2012 Monaco
2012/0165100 A1 6/2012 Lalancette et al.
2012/0166971 A1 6/2012 Sachson et al.

(56) References Cited

U.S. PATENT DOCUMENTS

2012/0169855 A1 7/2012 Oh
2012/0172062 A1 7/2012 Altman et al.
2012/0173991 A1 7/2012 Roberts et al.
2012/0176401 A1 7/2012 Hayward et al.
2012/0184248 A1 7/2012 Speede
2012/0197724 A1 8/2012 Kendall
2012/0200743 A1 8/2012 Blanchflower et al.
2012/0209924 A1 8/2012 Evans et al.
2012/0210244 A1 8/2012 De et al.
2012/0212632 A1 8/2012 Mate et al.
2012/0220264 A1 8/2012 Kawabata
2012/0226748 A1 9/2012 Bosworth et al.
2012/0233000 A1 9/2012 Fisher et al.
2012/0236162 A1 9/2012 Imamura
2012/0239761 A1 9/2012 Linner et al.
2012/0250951 A1 10/2012 Chen
2012/0252418 A1 10/2012 Kandekar et al.
2012/0254325 A1 10/2012 Majeti et al.
2012/0278387 A1 11/2012 Garcia et al.
2012/0278692 A1 11/2012 Shi
2012/0290637 A1 11/2012 Perantatos et al.
2012/0299954 A1 11/2012 Wada et al.
2012/0304052 A1 11/2012 Tanaka et al.
2012/0304080 A1 11/2012 Wormald et al.
2012/0307096 A1 12/2012 Ford et al.
2012/0307112 A1 12/2012 Kunishige et al.
2012/0319904 A1 12/2012 Lee et al.
2012/0323933 A1 12/2012 He et al.
2012/0324018 A1 12/2012 Metcalf et al.
2013/0006759 A1 1/2013 Srivastava et al.
2013/0024757 A1 1/2013 Doll et al.
2013/0036364 A1 2/2013 Johnson
2013/0045753 A1 2/2013 Obermeyer et al.
2013/0050260 A1 2/2013 Reitan
2013/0055083 A1 2/2013 Fino
2013/0057587 A1 3/2013 Leonard et al.
2013/0059607 A1 3/2013 Herz et al.
2013/0060690 A1 3/2013 Oskolkov et al.
2013/0063369 A1 3/2013 Malhotra et al.
2013/0067027 A1 3/2013 Song et al.
2013/0071093 A1 3/2013 Hanks et al.
2013/0080254 A1 3/2013 Thramann
2013/0085790 A1 4/2013 Palmer et al.
2013/0086072 A1 4/2013 Peng et al.
2013/0090171 A1 4/2013 Holton et al.
2013/0095857 A1 4/2013 Garcia et al.
2013/0103760 A1 4/2013 Golding et al.
2013/0104053 A1 4/2013 Thornton et al.
2013/0110885 A1 5/2013 Brundrett, III
2013/0111514 A1 5/2013 Slavin et al.
2013/0128059 A1 5/2013 Kristensson
2013/0129252 A1 5/2013 Lauper
2013/0132477 A1 5/2013 Bosworth et al.
2013/0145286 A1 6/2013 Feng et al.
2013/0159110 A1 6/2013 Rajaram et al.
2013/0159919 A1 6/2013 Leydon
2013/0169822 A1 7/2013 Zhu et al.
2013/0173729 A1 7/2013 Starenky et al.
2013/0182133 A1 7/2013 Tanabe
2013/0185131 A1 7/2013 Sinha et al.
2013/0191198 A1 7/2013 Carlson et al.
2013/0194301 A1 8/2013 Robbins et al.
2013/0198176 A1 8/2013 Kim
2013/0201187 A1 8/2013 Tong et al.
2013/0218965 A1 8/2013 Abrol et al.
2013/0218968 A1 8/2013 Mcevilly et al.
2013/0222323 A1 8/2013 Mckenzie
2013/0227476 A1 8/2013 Frey
2013/0232194 A1 9/2013 Knapp et al.
2013/0249948 A1 9/2013 Reitan
2013/0257877 A1* 10/2013 Davis .................... G06N 3/006
345/473
2013/0263031 A1 10/2013 Oshiro et al.
2013/0265450 A1 10/2013 Barnes, Jr.
2013/0267253 A1 10/2013 Case et al.
2013/0275352 A1 10/2013 Servi et al.
2013/0275505 A1 10/2013 Gauglitz et al.
2013/0290443 A1 10/2013 Collins et al.
2013/0304646 A1 11/2013 De Geer
2013/0311255 A1 11/2013 Cummins et al.
2013/0325964 A1 12/2013 Berberat
2013/0344896 A1 12/2013 Kirmse et al.
2013/0346869 A1 12/2013 Asver et al.
2013/0346877 A1 12/2013 Borovoy et al.
2014/0006129 A1 1/2014 Heath
2014/0011538 A1 1/2014 Mulcahy et al.
2014/0019264 A1 1/2014 Wachman et al.
2014/0032682 A1 1/2014 Prado et al.
2014/0040712 A1 2/2014 Chang et al.
2014/0043204 A1 2/2014 Basnayake et al.
2014/0043329 A1 2/2014 Wang et al.
2014/0045530 A1 2/2014 Gordon et al.
2014/0047016 A1 2/2014 Rao
2014/0047045 A1 2/2014 Baldwin et al.
2014/0047335 A1 2/2014 Lewis et al.
2014/0049652 A1 2/2014 Moon et al.
2014/0052485 A1 2/2014 Shidfar
2014/0052633 A1 2/2014 Gandhi
2014/0055554 A1 2/2014 Du et al.
2014/0057660 A1 2/2014 Wager
2014/0082651 A1 3/2014 Sharifi
2014/0092130 A1 4/2014 Anderson et al.
2014/0096029 A1 4/2014 Schultz
2014/0114565 A1 4/2014 Aziz et al.
2014/0122658 A1 5/2014 Haeger et al.
2014/0122787 A1 5/2014 Shalvi et al.
2014/0125678 A1 5/2014 Wang et al.
2014/0129322 A1 5/2014 George et al.
2014/0129343 A1 5/2014 Finster et al.
2014/0129953 A1 5/2014 Spiegel
2014/0143143 A1 5/2014 Fasoli et al.
2014/0149519 A1 5/2014 Redfern et al.
2014/0155102 A1 6/2014 Cooper et al.
2014/0160149 A1* 6/2014 Blackstock ............. A63F 13/79
345/619
2014/0173424 A1 6/2014 Hogeg et al.
2014/0173457 A1 6/2014 Wang et al.
2014/0189592 A1 7/2014 Benchenaa et al.
2014/0207679 A1 7/2014 Cho
2014/0214471 A1 7/2014 Schreiner, III
2014/0222564 A1 8/2014 Kranendonk et al.
2014/0258405 A1 9/2014 Perkin
2014/0265359 A1 9/2014 Cheng et al.
2014/0266703 A1 9/2014 Dalley, Jr. et al.
2014/0279061 A1 9/2014 Elimeliah et al.
2014/0279436 A1 9/2014 Dorsey et al.
2014/0279540 A1 9/2014 Jackson
2014/0280537 A1 9/2014 Pridmore et al.
2014/0282096 A1 9/2014 Rubinstein et al.
2014/0287779 A1 9/2014 O'keefe et al.
2014/0289833 A1 9/2014 Briceno
2014/0306986 A1 10/2014 Gottesman et al.
2014/0317302 A1 10/2014 Naik
2014/0324627 A1 10/2014 Haver et al.
2014/0324629 A1 10/2014 Jacobs
2014/0325383 A1 10/2014 Brown et al.
2015/0020086 A1 1/2015 Chen et al.
2015/0046278 A1 2/2015 Pei et al.
2015/0052462 A1 2/2015 Kulkarni
2015/0071619 A1 3/2015 Brough
2015/0087263 A1 3/2015 Branscomb et al.
2015/0088622 A1 3/2015 Ganschow et al.
2015/0095020 A1 4/2015 Leydon
2015/0096042 A1 4/2015 Mizrachi
2015/0100647 A1 4/2015 Agustin et al.
2015/0116529 A1 4/2015 Wu et al.
2015/0154232 A1 6/2015 Ovsjanikov et al.
2015/0169827 A1 6/2015 Laborde
2015/0172534 A1 6/2015 Miyakawa et al.
2015/0178260 A1 6/2015 Brunson
2015/0206000 A1 7/2015 El Kaliouby et al.
2015/0206349 A1 7/2015 Rosenthal et al.
2015/0222814 A1 8/2015 Li et al.
2015/0261917 A1 9/2015 Smith

(56) References Cited

U.S. PATENT DOCUMENTS

| | | | |
|---|---|---|---|
| 2015/0312184 | A1 | 10/2015 | Langholz et al. |
| 2015/0350136 | A1 | 12/2015 | Flynn, III et al. |
| 2015/0365795 | A1 | 12/2015 | Allen et al. |
| 2015/0378502 | A1 | 12/2015 | Hu et al. |
| 2016/0006927 | A1 | 1/2016 | Sehn |
| 2016/0006987 | A1 | 1/2016 | Li et al. |
| 2016/0014063 | A1 | 1/2016 | Hogeg et al. |
| 2016/0050169 | A1 | 2/2016 | Ben et al. |
| 2016/0085773 | A1 | 3/2016 | Chang et al. |
| 2016/0085863 | A1 | 3/2016 | Allen et al. |
| 2016/0099901 | A1 | 4/2016 | Allen et al. |
| 2016/0127295 | A1 | 5/2016 | Karimli et al. |
| 2016/0134840 | A1 | 5/2016 | Mcculloch |
| 2016/0142889 | A1 | 5/2016 | O'connor et al. |
| 2016/0180887 | A1 | 6/2016 | Sehn |
| 2016/0182422 | A1 | 6/2016 | Sehn et al. |
| 2016/0182875 | A1 | 6/2016 | Sehn |
| 2016/0234149 | A1 | 8/2016 | Tsuda et al. |
| 2016/0239248 | A1 | 8/2016 | Sehn |
| 2016/0277419 | A1 | 9/2016 | Allen et al. |
| 2016/0321708 | A1 | 11/2016 | Sehn |
| 2017/0006094 | A1 | 1/2017 | Abou Mahmoud et al. |
| 2017/0061308 | A1 | 3/2017 | Chen et al. |
| 2017/0080346 | A1* | 3/2017 | Abbas .................... A63F 13/79 |
| 2017/0087473 | A1 | 3/2017 | Siegel et al. |
| 2017/0103432 | A1* | 4/2017 | Borchetta .......... G06Q 30/0279 |
| 2017/0113140 | A1 | 4/2017 | Blackstock et al. |
| 2017/0118145 | A1 | 4/2017 | Aittoniemi et al. |
| 2017/0199855 | A1 | 7/2017 | Fishbeck |
| 2017/0235848 | A1 | 8/2017 | Van et al. |
| 2017/0286366 | A1 | 10/2017 | Chang et al. |
| 2017/0287006 | A1 | 10/2017 | Azmoodeh et al. |
| 2017/0310934 | A1 | 10/2017 | Du et al. |
| 2017/0312634 | A1 | 11/2017 | Ledoux et al. |
| 2017/0352070 | A1 | 12/2017 | Deluca et al. |
| 2017/0361234 | A1 | 12/2017 | Lobb et al. |
| 2017/0364484 | A1 | 12/2017 | Hayes |
| 2018/0025219 | A1 | 1/2018 | Baldwin et al. |
| 2018/0047200 | A1 | 2/2018 | O'hara et al. |
| 2018/0113587 | A1 | 4/2018 | Allen et al. |
| 2018/0115503 | A1 | 4/2018 | Baldwin et al. |
| 2018/0315076 | A1 | 11/2018 | Andreou |
| 2018/0315133 | A1 | 11/2018 | Brody et al. |
| 2018/0315134 | A1 | 11/2018 | Amitay et al. |
| 2019/0001223 | A1 | 1/2019 | Blackstock et al. |
| 2019/0057616 | A1 | 2/2019 | Cohen et al. |
| 2019/0188920 | A1 | 6/2019 | Mcphee et al. |
| 2019/0280997 | A1 | 9/2019 | Baldwin et al. |

FOREIGN PATENT DOCUMENTS

| | | | |
|---|---|---|---|
| CN | 102265586 | A | 11/2011 |
| CN | 104333688 | A | 2/2015 |
| CN | 104335607 | A | 2/2015 |
| CN | 105141507 | A | 12/2015 |
| CN | 105589975 | A | 5/2016 |
| CN | 109716264 | A | 5/2019 |
| CN | 109863532 | A | 6/2019 |
| CN | 110168478 | A | 8/2019 |
| CN | 109716264 | B | 11/2022 |
| CN | 115526947 | A | 12/2022 |
| CN | 115810059 | A | 3/2023 |
| CN | 115526947 | B | 8/2026 |
| EP | 2051480 | A1 | 4/2009 |
| EP | 2151797 | A1 | 2/2010 |
| EP | 2184092 | A2 | 5/2010 |
| EP | 2426902 | | 3/2012 |
| GB | 2399928 | A | 9/2004 |
| JP | 2001230801 | A | 8/2001 |
| JP | 5497931 | B2 | 3/2014 |
| KR | 19990073076 | A | 10/1999 |
| KR | 20010078417 | A | 8/2001 |
| KR | 101445263 | B1 | 9/2014 |
| KR | 20160017035 | A | 2/2016 |
| KR | 102166159 | B1 | 10/2020 |
| KR | 102168367 | B1 | 10/2020 |
| KR | 102168522 | B1 | 10/2020 |
| KR | 102168823 | B1 | 10/2020 |
| KR | 102247348 | B1 | 5/2021 |
| KR | 102295869 | B1 | 9/2021 |
| KR | 102391697 | B1 | 4/2022 |
| KR | 102495600 | B1 | 2/2023 |
| WO | WO-1996024213 | A1 | 8/1996 |
| WO | WO-1999063453 | A1 | 12/1999 |
| WO | WO-2000058882 | A1 | 10/2000 |
| WO | WO-2001029642 | A1 | 4/2001 |
| WO | WO-2001050703 | A3 | 7/2001 |
| WO | WO-2003094072 | A1 | 11/2003 |
| WO | 2004079530 | | 9/2004 |
| WO | WO-2004095308 | A1 | 11/2004 |
| WO | WO-2006107182 | A1 | 10/2006 |
| WO | WO-2006118755 | A2 | 11/2006 |
| WO | WO-2007092668 | A2 | 8/2007 |
| WO | WO-2007134402 | A1 | 11/2007 |
| WO | WO-2009043020 | A2 | 4/2009 |
| WO | WO-2011040821 | A1 | 4/2011 |
| WO | WO-2011119407 | A1 | 9/2011 |
| WO | WO-2012139276 | A1 | 10/2012 |
| WO | WO-2013008238 | A1 | 1/2013 |
| WO | WO-2013027893 | A1 | 2/2013 |
| WO | WO-2013045753 | A1 | 4/2013 |
| WO | WO-2013152454 | A1 | 10/2013 |
| WO | WO-2013166588 | A1 | 11/2013 |
| WO | WO-2014006129 | A1 | 1/2014 |
| WO | WO-2014031899 | A1 | 2/2014 |
| WO | WO-2014068573 | A1 | 5/2014 |
| WO | WO-2014115136 | A1 | 7/2014 |
| WO | WO-2014194262 | A2 | 12/2014 |
| WO | WO-2014194439 | A1 | 12/2014 |
| WO | WO-2015084286 | A1 | 6/2015 |
| WO | WO-2015192026 | A1 | 12/2015 |
| WO | WO-2016044424 | A1 | 3/2016 |
| WO | WO-2016054562 | A1 | 4/2016 |
| WO | WO-2016065131 | A1 | 4/2016 |
| WO | WO-2016090605 | A1 | 6/2016 |
| WO | WO-2016100318 | A2 | 6/2016 |
| WO | WO-2016100318 | A3 | 6/2016 |
| WO | WO-2016100342 | A1 | 6/2016 |
| WO | WO-2016149594 | A1 | 9/2016 |
| WO | WO-2016179166 | A1 | 11/2016 |
| WO | WO-2018017728 | A1 | 1/2018 |
| WO | WO-2018081013 | A1 | 5/2018 |
| WO | WO-2018102562 | A1 | 6/2018 |
| WO | WO-2018129531 | A1 | 7/2018 |
| WO | WO-2019089613 | A1 | 5/2019 |

OTHER PUBLICATIONS

"Adding photos to your listing", eBay, [Online] Retrieved from the Internet: <URL: http://pages.ebay.com/help/sell/pictures.html>, (accessed May 24, 17), 4 pgs.

"U.S. Appl. No. 15/290,943, Final Office Action mailed Jun. 8, 2018", 18 pgs.

"U.S. Appl. No. 15/290,943, Non Final Office Action mailed Jan. 26, 2018", 17 pgs.

"U.S. Appl. No. 15/290,943, Non Final Office Action mailed Sep. 19, 2018", 19 pgs.

"U.S. Appl. No. 15/290,943, Notice of Allowance mailed Feb. 21, 2019", 9 pgs.

"U.S. Appl. No. 15/290,943, Response filed Apr. 26, 2018 to Non Final Office Action mailed Jan. 26, 2018", 17 pgs.

"U.S. Appl. No. 15/290,943, Response filed Sep. 10, 2018 to Final Office Action mailed Jun. 8, 2018", 12 pgs.

"U.S. Appl. No. 15/290,943, Response Filed Jan. 21, 2019 to Non Final Office Action mailed Sep. 19, 2018", 14 pgs.

"U.S. Appl. No. 16/421,063, Non Final Office Action mailed Mar. 20, 2020", 7 pgs.

"U.S. Appl. No. 16/421,063, Notice of Allowability mailed Aug. 25, 2022", 2 pgs.

"U.S. Appl. No. 16/421,063, Notice of Allowability mailed Oct. 21, 2022", 2 pgs.

(56) References Cited

OTHER PUBLICATIONS

"U.S. Appl. No. 16/421,063, Notice of Allowability mailed Oct. 29, 2020", 6 pgs.
"U.S. Appl. No. 16/421,063, Notice of Allowability mailed Nov. 5, 2020", 6 pgs.
"U.S. Appl. No. 16/421,063, Notice of Allowance mailed Jul. 20, 2022", 9 pgs.
"U.S. Appl. No. 16/421,063, Notice of Allowance mailed Jul. 28, 2020", 9 pgs.
"U.S. Appl. No. 16/421,063, Response filed Jun. 22, 2020 to Non Final Office Action mailed Mar. 20, 2020", 9 pgs.
"BlogStomp", StompSoftware, [Online] Retrieved from the Internet: <URL: http://stompsoftware.com/blogstomp>, (accessed May 24, 2017), 12 pgs.
"Chinese Application Serial No. 201780057353.7, Office Action mailed May 6, 2022", w/ English Translation, 4 pgs.
"Chinese Application Serial No. 201780057353.7, Office Action mailed Aug. 3, 2021", w/ English translation, 13 pgs.
"Chinese Application Serial No. 201780057353.7, Response filed Jul. 15, 2022 to Office Action mailed May 6, 2022", w/ English claims, 8 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (IOS/Android): Give Pictures a Sense of Place", TechPP, [Online] Retrieved from the Internet: <URL: http://techpp.com/2013/02/15/instaplace-app-review>, (2013), 13 pgs.
"InstaPlace Photo App Tell the Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"International Application Serial No. PCT/US2017/042883, International Preliminary Report on Patentability mailed Jan. 31, 2019", 6 pgs.
"International Application Serial No. PCT/US2017/042883, International Search Report mailed Sep. 27, 2017", 2 pgs.
"International Application Serial No. PCT/US2017/042883, Written Opinion mailed Sep. 27, 2017", 4 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2019-7004463, Notice of Preliminary Rejection mailed Apr. 24, 2020", w/ English translation, 8 pgs.
"Korean Application Serial No. 10-2019-7004463, Response filed Jun. 24, 2020 to Notice of Preliminary Rejection mailed Apr. 24, 2020", w/ English Claims, 18 pgs.
"Korean Application Serial No. 10-2020-7003688, Notice of Preliminary Rejection mailed Apr. 24, 2020", w/ English translation, 8 pgs.
"Korean Application Serial No. 10-2020-7003688, Response filed Jun. 24, 2020 to Notice of Preliminary Rejection mailed Apr. 24, 2020", w/ English Claims, 16 pgs.
"Korean Application Serial No. 10-2020-7028760, Notice of Preliminary Rejection mailed Nov. 2, 2020", w/ English Translation, 8 pgs.
"Korean Application Serial No. 10-2020-7028760, Response filed Dec. 31, 2020 Notice of Preliminary Rejection mailed Nov. 2, 2020", w/ English Claims, 17 pgs.
"Korean Application Serial No. 10-2020-7029636, Notice of Preliminary Rejection mailed Nov. 2, 2020", w/ English Translation, 8 pgs.
"Korean Application Serial No. 10-2020-7029636, Response filed Dec. 29, 2020 to Notice of Preliminary Rejection mailed Nov. 2, 2020", w/ English Translation, 12 pgs.
"Korean Application Serial No. 10-2021-7012626, Notice of Preliminary Rejection mailed Jun. 28, 2021", w/ English Translation, 10 pgs.
"Korean Application Serial No. 10-2022-7013785, Notice of Preliminary Rejection mailed May 27, 2022", W/English Translation, 9 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Pocket Avatars, tracks your face and mood By Guy Wright", New Intel messaging app, [Online]. Retrieved from the Internet: <https://www.itproportal.com/2014/06/23/new-intel-messaging-app-pocket-avatars-tracks-your-face-and-mood>, (Jun. 23, 2014).
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Macleod, Duncan, "Macys Believe-o-Magic App", [Online] Retrieved from the Internet: <URL: http://theinspirationroom.com/daily/2011/macys-believe-o-magic-app>, (Nov. 14, 2011). 10 pgs.
Macleod, Duncan, "Starbucks Cup Magic Lets Merry", [Online] Retrieved from the Internet: <URL: http://theinspirationroom.com/daily/2011/starbucks-cup-magic>, Nov. 12, 2011), 8 pgs.
Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, a Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.
"Korean Application Serial No. 10-2022-7013785, Response filed Aug. 29, 2022 to Notice of Preliminary Rejection mailed May 27, 2022", w/ English Claims, 14 pgs.
"Chinese Application Serial No. 202211268350.7, Office Action mailed Oct. 15, 2025", w/ English translation, 15 pgs.
"Chinese Application Serial No. 202211268350.7, Response filed Feb. 5, 2026 to Office Action mailed Oct. 15, 2025", W/ English Claims, 11 pgs.
"Chinese Application Serial No. 202211268350.7, Office Action mailed Apr. 23, 2026", w/o English Translation, 3 pgs.

(56) References Cited

OTHER PUBLICATIONS

"Chinese Application Serial No. 202211268350.7, Response filed Jun. 5, 2026 to Office Action mailed Apr. 23, 2026", W/O English Claims, 15 pgs.
"Chinese Application Serial No. 202211276646.3, Office Action mailed Feb. 11, 2026", w/ English Translation, 15 pgs.
"Chinese Application Serial No. 202211276646.3, Response filed Jun. 5, 2026 to Office Action mailed Feb. 11, 2026", W/English Claims, 12 pgs.
"Chinese Application Serial No. 202211276646.3, Response filed Aug. 17, 2026 to Office Action mailed Jun. 18, 2026", W/English Claims, 11 pgs.

* cited by examiner

GENERATING CUSTOMIZED ELECTRONIC MESSAGING GRAPHICS

CROSS-REFERENCE TO RELATED APPLICATION

This Application is a continuation of U.S. application Ser. No. 16/421,063, filed May 23, 2019, which application is a continuation and claims priority to U.S. Ser. No. 15/290,943, filed on Oct. 11, 2016, now issued as U.S. Pat. No. 10,348, 662, which claims priority to U.S. Provisional Patent Application No. 62/364,190, filed Jul. 19, 2016, the disclosures of each of which are incorporated by reference in their entirety.

BACKGROUND

The popularity of electronic messaging, particularly instant messaging, continues to grow. Users increasingly use "emoji" (which are ideograms and icons) within electronic messages such as texts and emails, reflecting a global demand to communicate more visually. However, conventional emoji and similar graphics are typically generic and lacking in diversity: every individual user is represented by the same set of faces, irrespective of appearance, gender or ethnicity. Furthermore, every conversation that uses conventional emoji looks identical, and there is no visual personality or cue to identify the participants or distinguish one interaction from the next. Embodiments of the present disclosure address these and other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging software and systems by generating and displaying customized graphics within electronic messages. The custom graphic may be generated based on a user identifier and one or more scene identifiers. For example, a user may input one or more conventional emoji, text, and other input within an electronic message (such as an SMS text or email) and the system will generate the custom graphic within the electronic message, replacing the input. The customized image may be sized based on the position of the input within the message, allowing smaller or larger images to automatically be generated and presented to the user.

In some embodiments, customized graphics may be generated and presented within an electronic message based on sensor information retrieved from the sensor component(s) of a mobile device, such as location information, motion information, light levels, temperature, and the like. The customized graphic may also be generated based on information regarding a user retrieved from a social network, and/or information regarding the user's mood. The customized graphics can be generated using such information along with a personalized avatar for the user (as well as the user's friends). For example, the system may determine from calendar information and geolocation information that the user is enjoying a birthday celebration with two of the user's friends at an Italian restaurant, and generate a graphic showing smiling avatars of the three friends sharing an oversized bowl of pasta. In another example, the system may determine from a user's previous electronic messages and social media posts that the user is currently at home with the flu, and generate a custom graphic showing an unhappy avatar of the user laying in bed with a box of tissues and a thermometer in his/her mouth. In this context, an "avatar" may include any image resembling (or otherwise associated with) the user. Among other things, using user-associated avatars by the embodiments of the present disclosure provide a level of personalization to electronic messages that is simply not possible with conventional UNICODE emoji or other standard characters.

Figure 1:
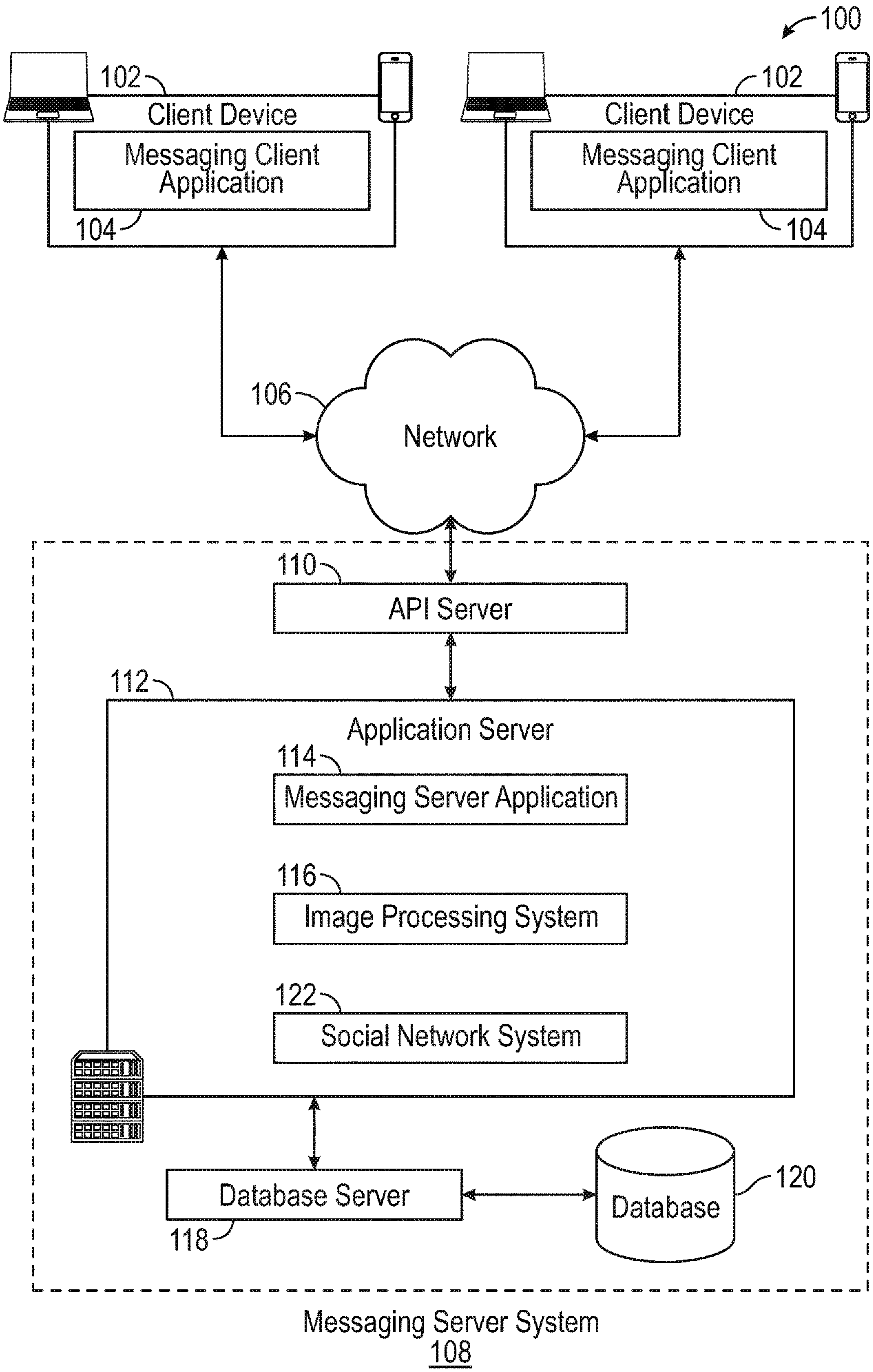
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, and/or any other wearable devices.

Figure 2:
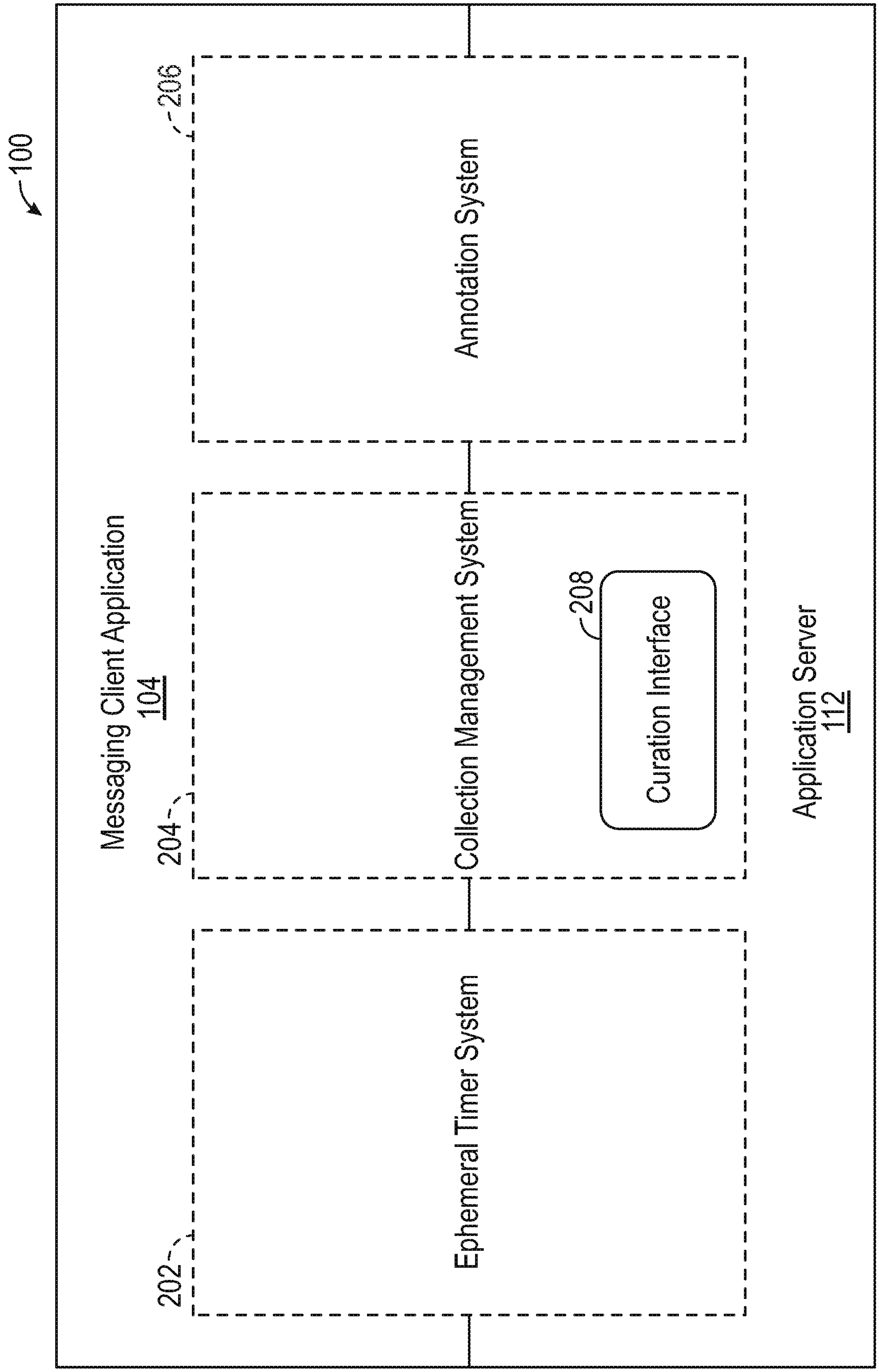
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
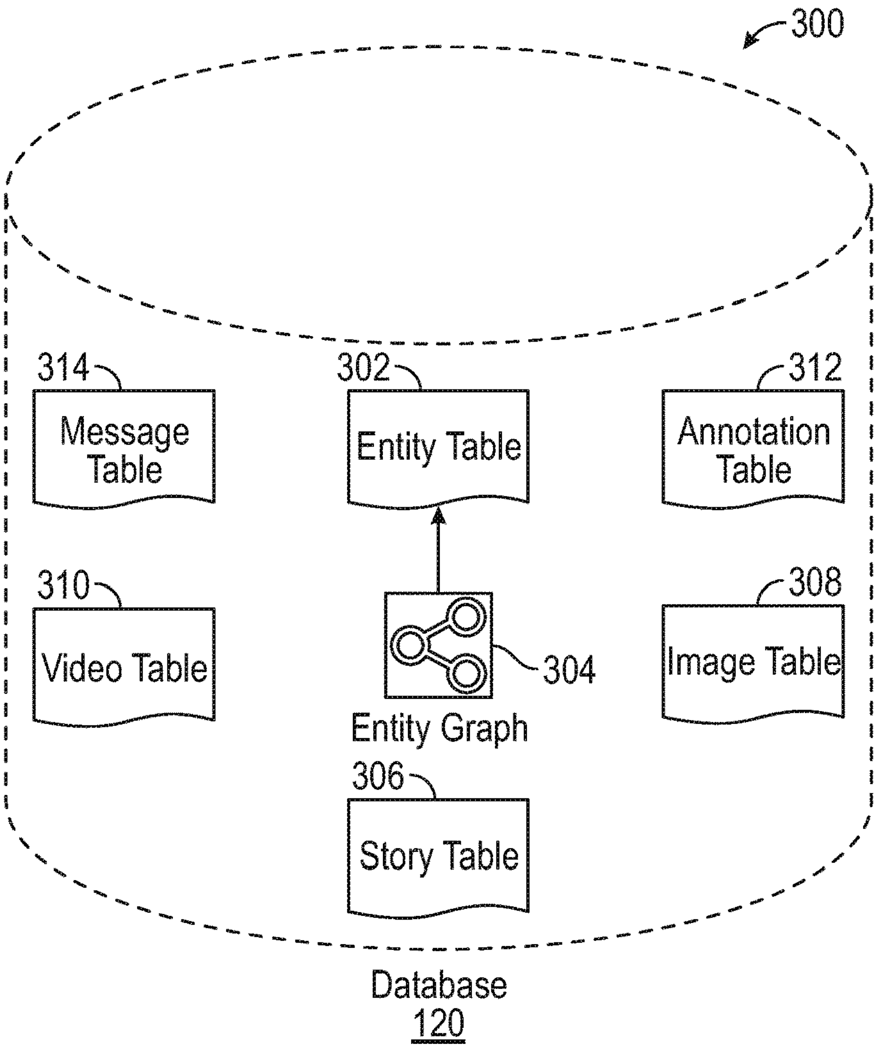
FIG. 3 is a schematic diagram illustrating data which may be stored in the database of the messaging server system, according to various exemplary embodiments.

In another exemplary embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images for use within electronic messages such as SMS or MMS texts and emails. The customized images may also be utilized in conjunction with the SNAPCHAT stories, SNAPCHAT filters, and ephemeral messaging functionality discussed herein.

Figure 4A:
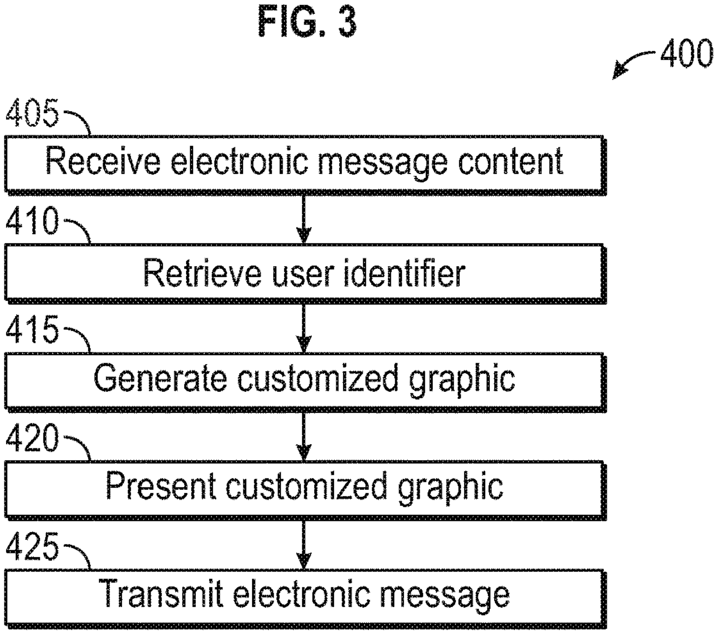
FIGS. 4A and 4B are exemplary flow diagrams of processes according to various aspects of the disclosure.

FIG. 4A depicts an exemplary process according to various aspects of the present disclosure. In this example, method 400 includes receiving content for an electronic message (405), retrieving a user identifier (410), generating a customized graphic based on the electronic message content and the user identifier (415), presenting the customized graphic (420), and transmitting an electronic message containing the customized graphic (425). The steps of method 400 may be performed in whole or in part, may be performed in conjunction with some or all of the steps in other methods (such as method 430 in FIG. 4B), and may be performed by any number of different systems, such as the systems described in FIGS. 1 and/or 7.

Figure 5A:
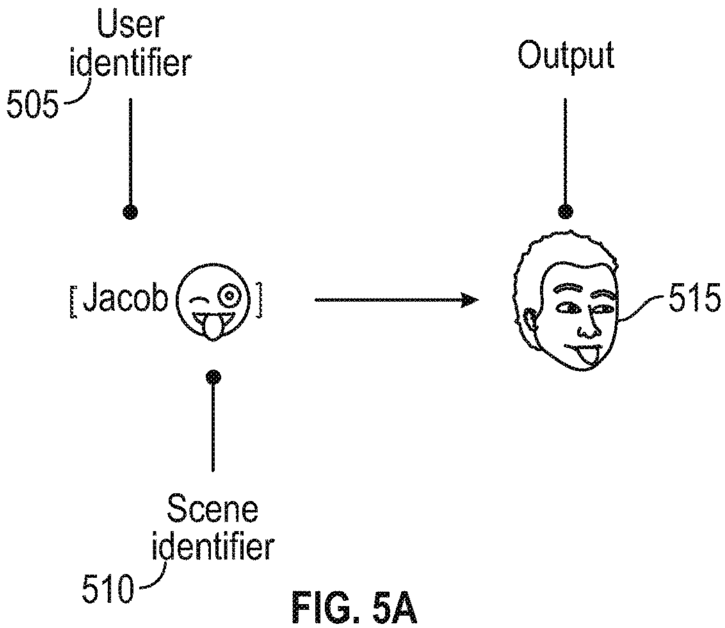
FIGS. 5A-5F are screenshots illustrating the steps of the methods described in FIGS. 4A-4B.

In some embodiments, customized graphics may be generated to replace or supplement emoji characters/icons defined by the UNICODE standard. For example, referring to FIG. 5A, a scene identifier 510 (the emoji character) is retrieved (405) in conjunction with retrieving (410) a user identifier ("jacob") 505 based on content for an electronic message entered by a user (e.g., via an input device). Based on the user identifier 505 and the scene identifier 510, the system generates (415) a custom graphic 515. In this example, the custom graphic 515 is a personalized avatar of the user mimicking the winking, tongue-extended emoji in the scene identifier 510. As used herein, an "electronic message" may refer to any message in electronic form, such as an email, a short message service (SMS) message, a multimedia message service (MMS) message, an instant message (IM), Internet Relay Chat (IRC) messages, as well as any other form of real-time, near-real-time, synchronous, or asynchronous electronic messaging format.

Figure 5B:
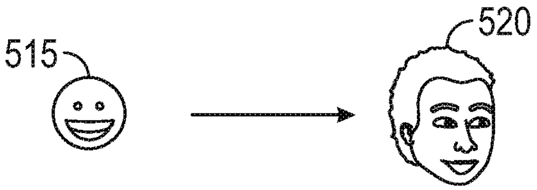
Figure 5C:
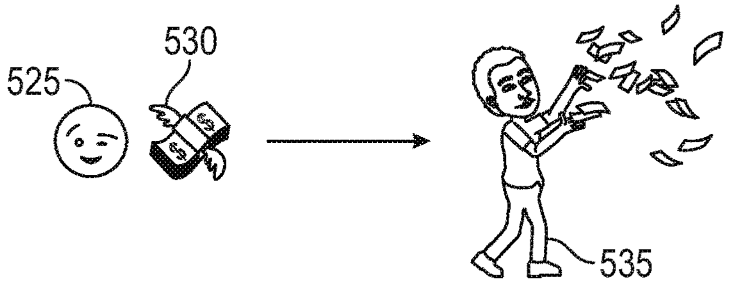
Figure 5D:
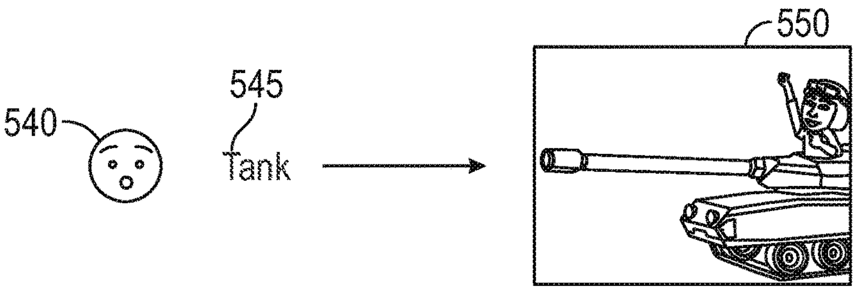
Figure 5E:
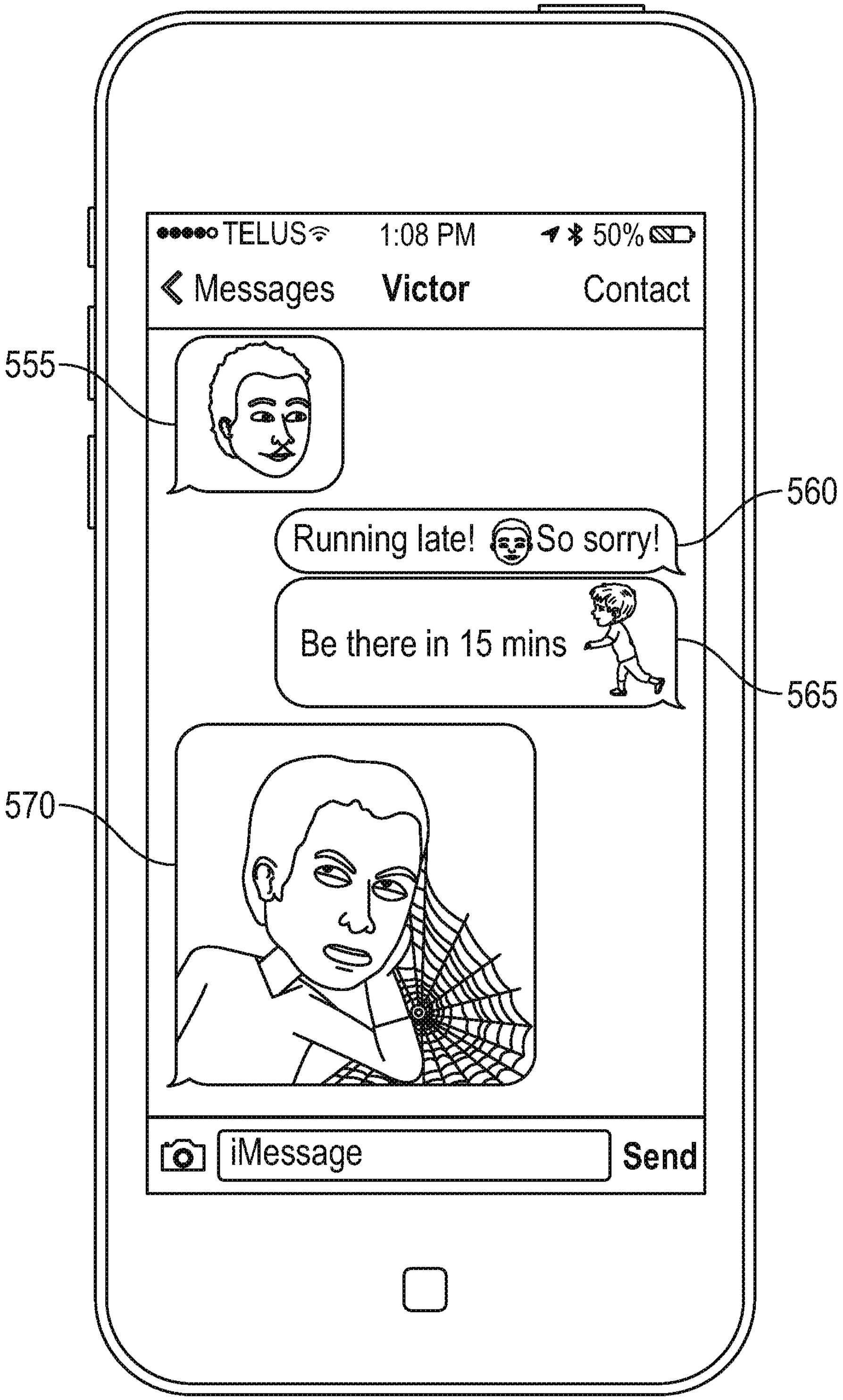
Figure 5F:
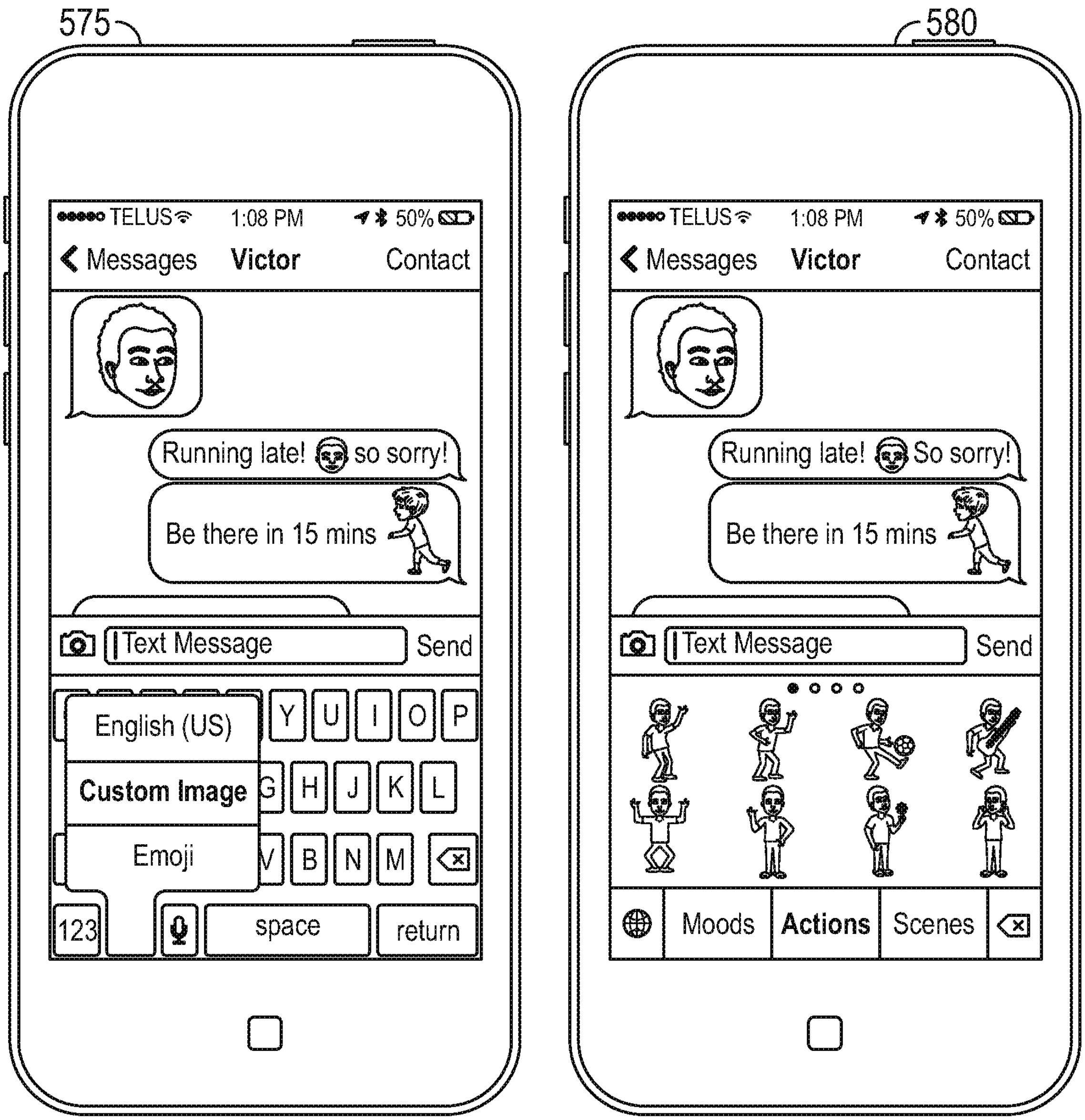

In some embodiments, the custom graphic 515 is pre-generated and presented (425) in a menu of graphics, such as shown at the bottom of the screenshot 580 in FIG. 5F. Additionally or alternatively, the custom graphic 515 can be generated (415) in real-time or near-real time in response to a user's input in an electronic message. For example, the user's input of UNICODE characters (such as emoji) and/or text can be used to generate a custom graphic that replaces the user's input within the text message. For example, referring to FIG. 5B, the system may retrieve (405), from the user's input into an electronic message, a smiling face emoji scene identifier 515, automatically retrieve a user identifier (410) stored in the device the user is using to input the message, and generate (415) the customized graphic of the user's avatar smiling 520, which may be presented in the electronic message instead of the original generic UNICODE character 515, thus replacing the user's original input.

Embodiments of the disclosure may retrieve (405) multiple scene identifiers. For example, referring to FIG. 5C, a user may enter as input into an electronic message two scene identifiers, a winking emoji 525 and flying money 530, which is used (in conjunction with the user's retrieved user identifier) to generate (415) a custom graphic of the user's avatar winking while throwing money.

In addition to retrieving UNICODE characters (such as emoji) as scene identifiers, embodiments of the present disclosure may retrieve and analyze text, other images and video to identify a scene identifier. For example, in FIG. 5D, the user enters a surprised emoji 540 and the word "tank" 545, which the system uses to generate a customized graphic of the user's avatar sitting on a tank 550. In other embodiments, the user could insert an image or video of a tank in place of the word "tank," and the system can perform an image recognition analysis of the input to identify the tank and generate the customized graphic 550.

The user identifier may be retrieved (410) from input within the electronic message. For example, the user could input, via the user interface of the user's computing device, his or her name to generate a customized image based on the user's own avatar, as well as text, an image, or video of another individual (e.g., the user's friend) to generate a customized image using the user's friend's avatar. Additionally or alternatively, the user identifier may be retrieved (410) based on information stored within the user's computing device. Any such identifier may be used, such as the user's full name or a username associated with the user. The user identifier may also be an identifier associated with the user's computing device, such as a Unique Device Identifier (UDID) or Identifier for Advertising (IDFA).

Embodiments of the present disclosure may generate (415) the customized graphic according to any other desired criteria, such as the graphic's position in the electronic message. Likewise, presentation (420) of a customized graphic may be based on its size. Referring now to FIG. 5E, a customized graphic that is presented by itself (such as graphic 555) may be displayed relatively larger than a customized graphic that is presented inline as the same size as surrounding text (such as graphic 560) or a graphic presented at the beginning or end of a line of text (such as graphic 565). In some embodiments, the custom graphic may also be displayed as a full image (such as graphic 570). Sizing of a customized graphic may be determined automatically by the system, based on user input, or a combination of the two.

Referring again to FIG. 4A, the electronic message containing the customized graphic may be transmitted (425) over the Internet for distribution to one or more recipients. A computer system performing the functionality method 400 may communicate with any number of other systems and devices, including a server. Such communication may be performed using a variety of different communication protocols and communication mediums, including those described above with reference to network 106. In some embodiments, for example, communication with the server may include transmitting an image modified with activity data to a server. In the exemplary system 700 shown in FIG. 7, such communication may be effected using communication module 740.

The electronic message may also be transmitted (425) directly to another user's device, or via another form of network other than the Internet. Additionally, the electronic message, the customized graphic, or both may be presented to the user and/or a recipient for a predetermined period of time, as discussed in more detail above with reference to ephemeral messages.

Figure 4B:
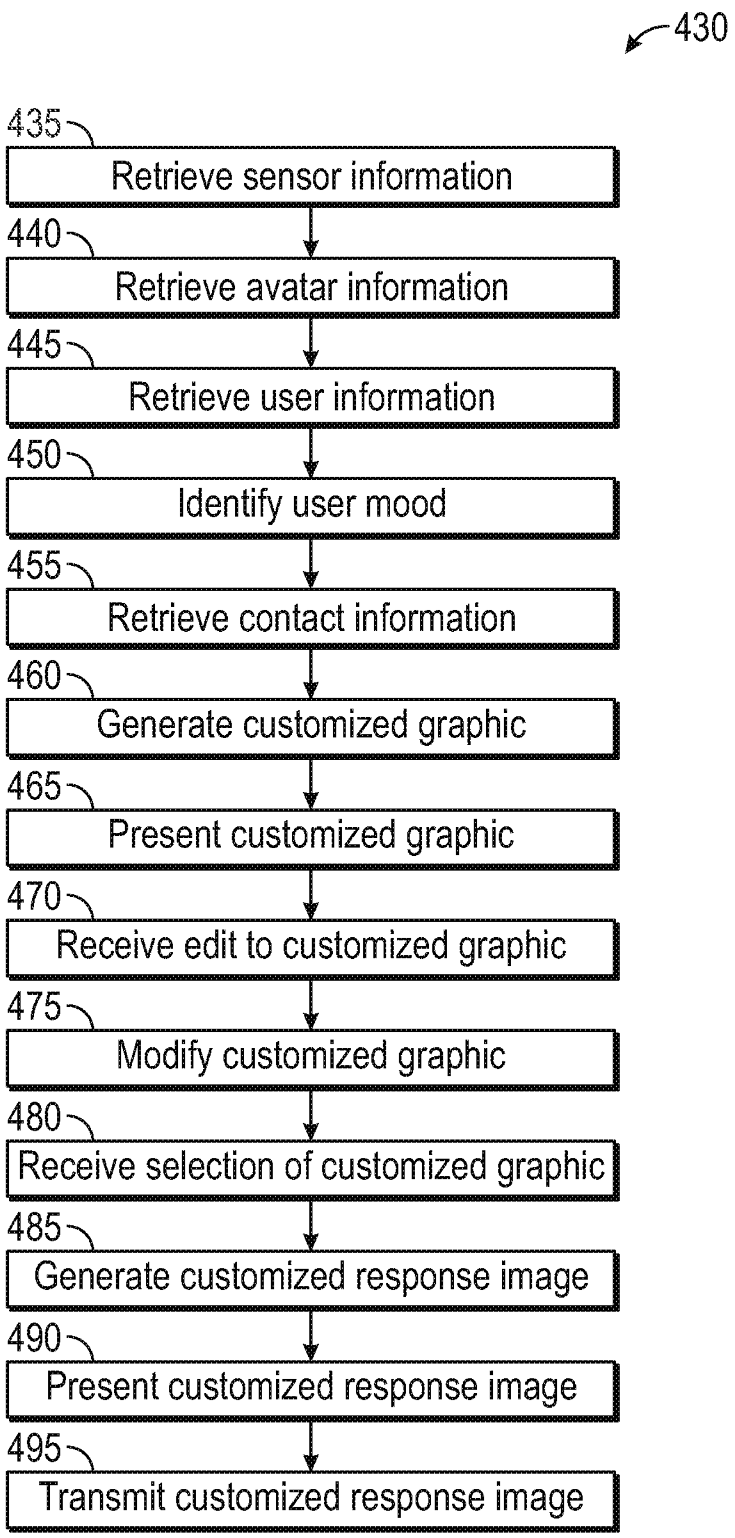

Customized graphics may be generated based on a variety of different information and used in a variety of different applications. FIG. 4B depicts another exemplary process according to various aspects of the disclosure. In this example, method 430 includes retrieving sensor information from a sensor component coupled to a computer system (435), retrieving avatar information associated with a user of the computer system (440), retrieving information regarding the user (445), identifying a mood of the user based on the retrieved user information (450), receiving information for a contact of the user (455), and generating a customized graphic (460). Method 430 further includes presenting the customized graphic (465), receiving an edit to the customized graphic (470), and modifying the customized graphic based on the received edits (475). Method 430 also includes receiving a selection of the customized graphic (480), generating (485) and presenting (490) a customized response image based on the selection, and transmitting the customized response image (495).

In various embodiments, a customized graphic may be generated (460) based on data collected from a variety of sensor components, including (for example) the biometric components 730, motion components 734, environmental components 736, and/or position components 738 described below with reference to FIG. 7, as well as other sensor components. In one exemplary embodiment, the sensor component includes a biometric component for detecting a facial expression of the user of a computing device, and wherein generating the customized graphic (460) includes identifying a mood of the user (450) based on the expression (e.g., happy, sad, excited, etc.) and generating the graphic (e.g., the expression on the face of the user's avatar) based on the identified mood. Such sensor components may be integrated with, or locally coupled to, the computing device used by a user to prepare an electronic message. Additionally or alternatively, such sensor components may be accessed remotely by the computing device over a network (e.g., the Internet).

The system may retrieve avatar information (440) associated with the user of a computing device, contacts of the user, or other individuals. As introduced above, the avatar of a user or individual may be any image resembling or otherwise associated with the user or individual. In addition to images, the retrieved avatar information may include any desired characteristics of the user, such as the user's age, height, weight, interests, preferences (e.g., for clothing), and such characteristics may be used in generating or modifying avatar images of the user/individual. In various embodiments, the avatar information may include any number of different images associated with the user, and generating (460) the customized graphic may including at least a portion of such images within the customized graphic. For example, the user's avatar information (e.g., images of the user's face from different angles and having different expressions) may be used to generate custom images, such as the user riding a tank (FIG. 5E) or kicking a soccer ball (FIG. 5F).

In addition to detecting a user's mood via a biometric component (as described above), the system may identify a user's mood (450) based on information regarding the user that can be retrieved (445) from a variety of sources. Any such information may be retrieved from any desired source, such as a social network entry by the user, a microblog entry by the user, an electronic communication by the user, or other source.

For example, the system may identify such entries over the Internet and perform a keyword search on such entries to identify words indicating the user's mood, such as "sad," "upset," "happy," and the like. Likewise, the system may perform an image recognition analysis of photos posted by the user (e.g., on the user's social network page) and identify facial expressions in a manner similar to the facial recognition analysis used based on the biometric component discussed above. Based on such entries, the system may generate the customized graphic (460) to reflect the user's mood, such as by showing the user's avatar in a graphic frowning in response to determining the user is sad or upset, or showing the user's avatar in a graphic smiling or laughing in response to determining the user is happy or excited. The system may, additionally or alternatively, determine a user's mood based on direct input from the user himself/herself. For example, the user may enter input (e.g., via the input device of the user interface on the user's computing device) to select the user's mood. Such input may take a variety of forms, such as a text description of the user's mood, and/or a graphic the user selects to indicate his/her mood (e.g., a happy face to indicate the user is happy).

In addition to information pertaining to the user of the computer system performing functionality associated with the embodiments of the present disclosure, the system may further retrieve or receive information regarding the user's contacts (455) for use in generating (460) customized graphics. In one exemplary embodiment, a contact of a user is identified as being associated with an electronic message (e.g., as the sender or recipient) and information regarding the contact is retrieved (455) by the system. Such information may be retrieved from the computing device itself (e.g., from an electronic address book) as well as from external sources, such as a social network page associated with the contact (or containing information about the contact—such as from the user's social network page) or the contact's computing device. In some cases, the contact's information may include the contact's own personalized avatar information (e.g., images and characteristics associated with the contact) upon which the system can generate the customized graphic (460) to include a customized avatar image for the contact based on the contact's avatar information. The contact's customized avatar image may be presented (465) to the user as part of the customized graphic and in conjunction with an electronic message. The customized graphic may further be generated (460) based on the content of the electronic message itself. For example, if a user and a contact are engaged in an instant message discussion regarding mountain climbing together, the system could automatically retrieve avatar information for the user (440) and the contact (455) and generate a customized graphic depicting the user and the contact mountain climbing together for insertion into the electronic message. In this manner, embodiments of the present disclosure can greatly improve the functionality of electronic messaging systems by providing dynamic, customized visual content that the user can share with his or her contacts.

The system may also generate the customized graphic (460) based on other information, such as the current time of day, the current date, and event associated with the user or the user's contacts stored in the user's electronic calendar. For example, the system may determine, based on a calendar entry in the user's smartphone or other computing device and geolocation information for the computing device, that the user is currently at a birthday party for one of the user's contacts, and generate a customized image depicting avatars of the user and the user's contact with a birthday cake.

The customized graphic may be presented (465) in a variety of different ways, such as within an electronic message. In some embodiments, referring again to FIG. 5E, the graphic may be displayed alone (images 555 and 570), or in conjunction with text and/or other images (images 560 and 565). In some embodiments, some or all of the customized graphic may be selectable by the user, such as in a hypertext transfer protocol (HTTP) link to content on the Internet, or to initiate a software application of functionality thereof. The customized graphic may also be presented (465) as a selectable icon or link (as discussed below) as well as in conjunction with a media overlay (e.g., a SNAPCHAT filter) and/or or collection of electronic messages (e.g., a SNAPCHAT story). Menus of customized graphics may be presented for selection and inclusion in an electronic message, as shown in the example depicted in FIG. 5G. The customized graphic may also be presented (465) for a predetermined period of time as discussed in more detail above with reference to ephemeral messages.

In one exemplary embodiment, the customized graphic includes a customized avatar of the user or a contact of the user, and the graphic is selectable by the user. In response to receiving a selection (480) of the customized graphic by the user, the system generates a customized response image (485) based on the current mood of user or the user's contact and presents (490) the response image to the user via the display screen of the user's computing device. The user may further select the customized response image to transmit the response image to the contact.

In a particular example of the response image, consider an avatar of the user's contact that it is presented next to the contact's name in the user's address book. The contact's avatar may be dynamically updated to indicate the contact's mood throughout the day. Selecting the avatar image of the user's contact may present information underlying the contact's mood (e.g., "Bob failed his test today" if Bob's avatar appears sad, or "Bob took first place in his race today" if Bob's avatar appears happy). Based on the mood of the contact and/or the underlying information associated with the mood, the system can generate one or more customized response images the user can send to the contact's computing device (alone or in conjunction with an electronic message) by selecting the contact's avatar. For example, the system may generate a generalized "cheer up" response image or a more specific "sorry about the test" response image in response to the first scenario above. Alternatively, the system may generate a generalized "congratulations!" response image or a more specific "congratulations on winning the race!" response image. The response image either may include one or more of the user's avatar image and the contact's avatar image. In some embodiments, a selection of possible response images may be generated and presented to the user, thus allowing the user to select the response image(s) the user feels is most appropriate to give the contact. The response image may be transmitted to the contact's computing device in any desired manner, such as directly to the contact's computing device over the Internet or to a server that reroutes the image to the contact. In this manner, embodiments of the present disclosure enhance the interaction between the user and his/her contacts and provide opportunities for discussion and interaction compared to traditional systems.

Embodiments of the present disclosure may generate (460) and present (465) custom graphics to the user, and receive edits (470) and modify (475) the customized graphic. For example, a customized graphic may be generated and displayed in a menu (as shown in FIG. 5G) of graphics for selection by the user. A user may use the input device of the user interface on the user's computing device to select a customized graphic and apply an edit, such as adding/removing text as well as making graphical edits. Graphical edits may include, for example, adding or removing features from the user's avatar (e.g., adding/removing a hat or mustache to the user's avatar), changing the size or shape of the image, applying graphic effects to the image (shading, stretching, tone, etc.), as well as other edits. The original customized graphic may be permanently modified (475) based on the user input, or saved as a different image for later retrieval by the user.

Software Architecture

Figure 6:
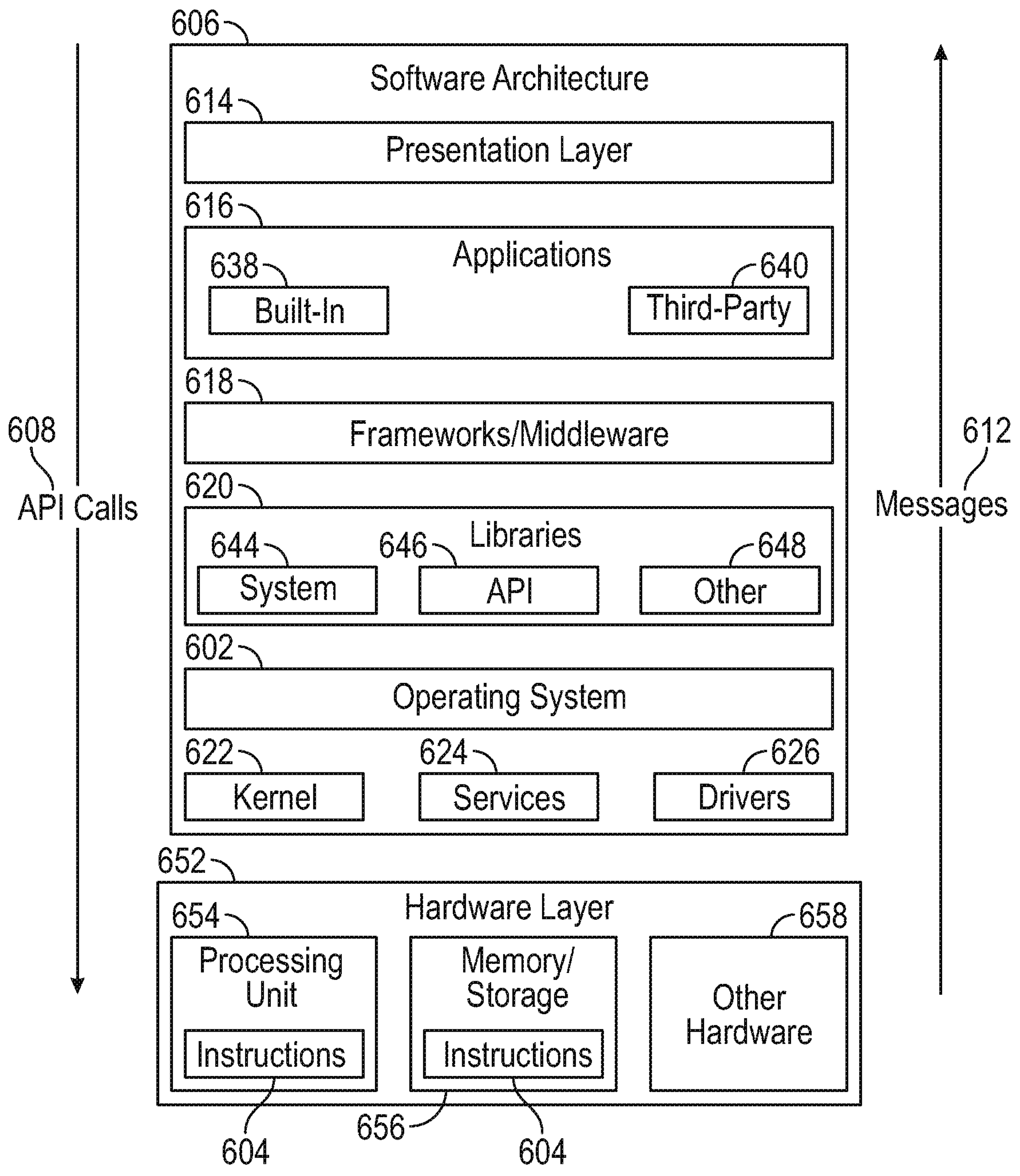
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
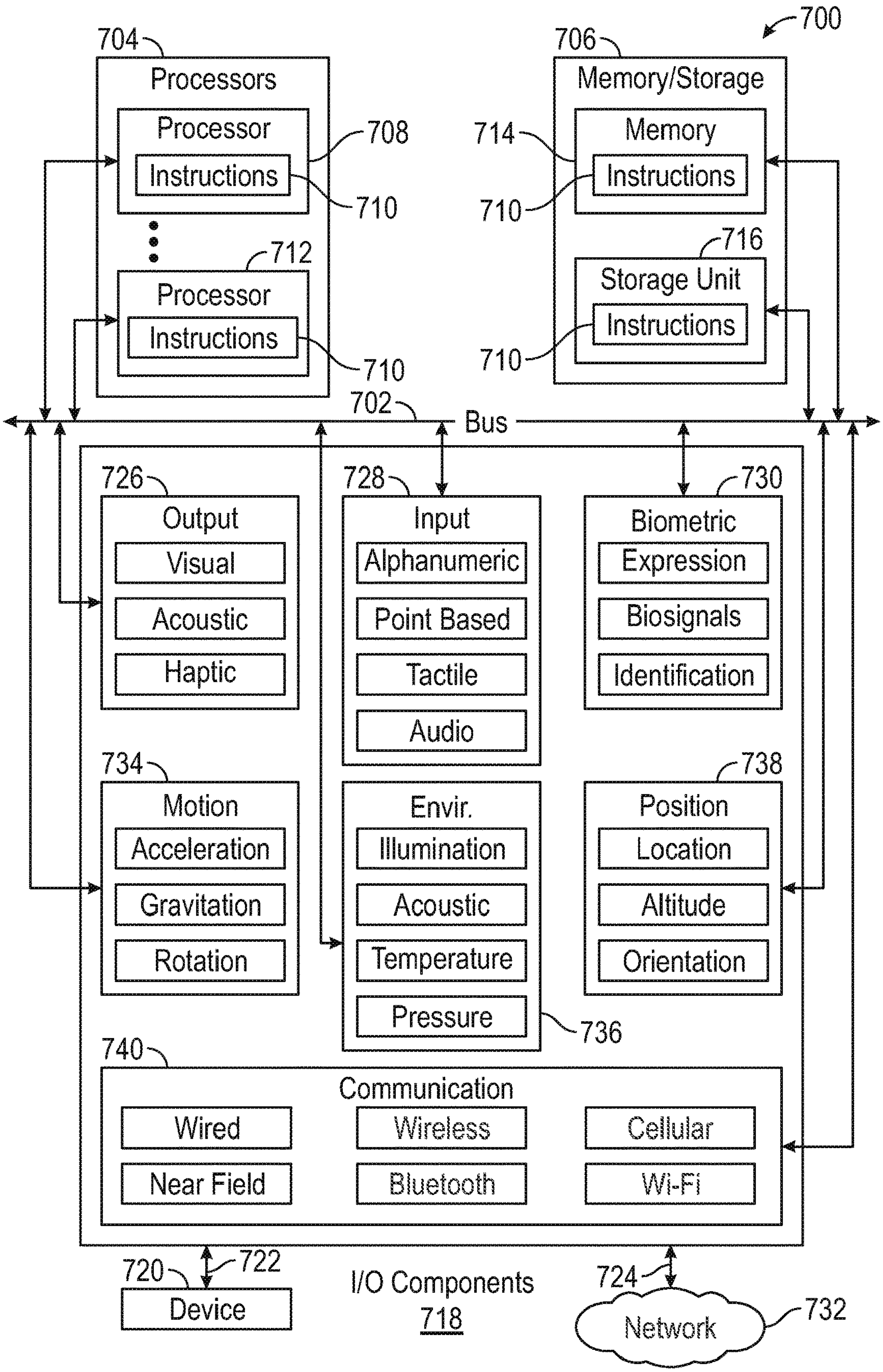
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. The input components 728 may also include one or more image-capturing devices, such as a digital camera for generating digital images and/or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates and/or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, SNAPCHAT, INC. 2016, All Rights Reserved.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
a processor; and
memory coupled to the processor and storing instructions that, when executed by the processor, cause the system to perform operations comprising:
retrieving information from social media posts posted by a user of the system;
generating a customized graphic based on the information and an avatar information associated with the user, wherein the avatar information includes one or more pre-existing images resembling the user, wherein generating the customized graphic includes:
selecting at least a portion of the one or more pre-existing images resembling the user based on the information from the social media posts to generate a modified image, and
incorporating the modified image into the customized graphic; and
presenting the customized graphic within an electronic message via a display screen of the system.

2. The system of claim 1, wherein selecting the at least a portion of the one or more of pre-existing images resembling the user based on the information from the social media posts includes: selecting the at least a portion of one or more pre-existing images resembling the user that is performing an action associated with the information from the social media posts.

3. The system of claim 1, further comprising a biometric component for detecting a facial expression of the user of the system, and wherein generating the customized graphic includes:
identifying a mood of the user based on the detected facial expression, and
generating the customized graphic based on the identified mood of the user, wherein generating the customized graphic based on the identified mood of the user includes selecting the at least a portion of the one or more pre-existing images resembling the user based on the identified mood of the user to generate the modified image.

4. The system of claim 1, wherein generating the customized graphic includes:
retrieving the information from the social media posts from a social network;
identifying a mood of the user based on the information from the social media posts; and
generating the customized graphic based on the identified mood of the user, wherein generating the customized graphic based on the identified mood of the user includes selecting the at least a portion of the one or more pre-existing images resembling the user based on the identified mood of the user to generate the modified image.

5. The system of claim 1, wherein generating the customized graphic includes:
receiving information identifying a mood of the user via a user interface of the system, and
generating the customized graphic based on the identified mood of the user, wherein generating the customized graphic based on the identified mood of the user includes selecting the at least a portion of one or more pre-existing images resembling the user based on the identified mood of the user to generate the modified image.

6. The system of claim 1, wherein the customized graphic and the electronic message are temporarily presented using the display screen for a predetermined period of time.

7. The system of claim 1, wherein generating the customized graphic is further based on one or more of:
a current time of day, a current date, and an event associated with the user identified by the system from a calendar entry stored in the memory.

8. The system of claim 1, wherein the system to perform operations further comprising:
receiving an edit to the customized graphic from the user via a user interface of the system; and
modifying the customized graphic based on the received edit, wherein the edit comprises one or more of: a text edit, and a graphic edit.

9. The system of claim 1, wherein the system to perform operations further comprising:

retrieving information regarding a contact of the user of the system associated with the electronic message, wherein the information for the contact includes avatar information associated with the contact and a current mood of the contact;

generating a customized avatar image for the contact of the user based on the avatar information associated with the contact and a current mood of the contact; and presenting the customized avatar image for the contact in conjunction with the electronic message via the display screen.

10. The system of claim 9, wherein the customized avatar image for the contact is selectable, and wherein the system to perform operations further comprising:

receiving a selection of the customized avatar image for the contact;

in response to the selection of the customized avatar image for the contact, generating a customized response image based on the current mood of the contact;

presenting the customized response image to the user via the display screen; and in response to selection of the customized response image by the user, transmitting the customized response image to a computer system associated with the contact.

11. A computer-implemented method comprising:

retrieving, by a computer system, information from social media posts posted by a user of the computer system;

generating, by the computer system, a customized graphic based on the information from the social media posts and an avatar information associated with the user, wherein the avatar information includes one or more pre-existing images resembling the user, wherein generating the customized graphic includes:

selecting at least a portion of the one or more pre-existing images resembling the user based on the information from the social media posts to generate a modified image, and incorporating the modified image into the customized graphic; and presenting, by the computer system, the customized graphic within an electronic message via a display screen of the computer system.

12. The method of claim 11, wherein selecting the at least a portion of the one or more pre-existing images resembling the user based on the information from the social media posts includes:

selecting the at least a portion of the one or more pre-existing images resembling the user that is performing an action associated with the information from the social media posts.

13. The method of claim 11, further comprising:

detecting a facial expression of the user of the computer system using a biometric component, and wherein generating the customized graphic further comprises:

identifying a mood of the user based on the detected facial expression, and generating the customized graphic based on the identified mood of the user, wherein generating the customized graphic based on the identified mood of the user includes selecting the at least a portion of the one or more pre-existing images resembling the user based on the identified mood of the user to generate the modified image.

14. The method of claim 11, wherein generating the customized graphic includes:

retrieving the information from the social media posts from a social network;

identifying a mood of the user based on the information from the social media posts; and generating the customized graphic based on the identified mood of the user, wherein generating the customized graphic based on the identified mood of the user includes selecting the at least a portion of one or more pre-existing images resembling the user based on the identified mood of the user to generate the modified image.

15. The method of claim 11, wherein generating the customized graphic includes:

receiving information identifying a mood of the user via an input device of the computer system, and generating the customized graphic based on the identified mood of the user, wherein generating the customized graphic based on the identified mood of the user includes selecting the at least a portion of one or more pre-existing images resembling the user based on the identified mood of the user to generate the modified image.

16. The method of claim 11, wherein the customized graphic and the electronic message are temporarily presented using the display screen for a predetermined period of time.

17. The method of claim 11, wherein generating the customized graphic is further based on one or more of: a current time of day, a current date, and an event associated with the user identified by the computer system from a calendar entry.

18. The method of claim 11, further comprising:

receiving an edit to the customized graphic from the user via an input device of the computer system; and modifying the customized graphic based on the received edit, wherein the edit comprises one or more of: a text edit, and a graphic edit.

19. The method of claim 11, further comprising:

retrieving information regarding a contact of the user of the computer system associated with the electronic message, wherein the information for the contact includes avatar information associated with the contact and a current mood of the contact;

generating a customized avatar image for the contact of the user based on the avatar information associated with the contact and a current mood of the contact; and presenting the customized avatar image for the contact in conjunction with the electronic message via the display screen of the computer system.

20. A non-transitory computer-readable medium storing instructions that, when executed by a computer system, cause the computer system to perform operations comprising:

retrieving information from social media posts posted by a user of the computer system;

generating customized graphic based on the information from the social media posts and an avatar information associated with the user, wherein the avatar information includes one or more pre-existing images resembling the user, wherein generating the customized graphic includes:

selecting at least a portion of the one or more pre-existing images resembling the user based on the information from the social media posts to generate a modified image, and incorporating the modified image into the customized graphic; and presenting the customized graphic within an electronic message via a display screen of the computer system.

* * * * *